United States Patent
Higgins et al.

(10) Patent No.: US 10,915,900 B1
(45) Date of Patent: Feb. 9, 2021

(54) INTERCHANGE ACTION DELAY BASED ON REFUND PREDICTION

(71) Applicant: Square, Inc., San Francisco, CA (US)

(72) Inventors: Michael Higgins, Alameda, CA (US); Ryder Moody, Bell Canyon, CA (US)

(73) Assignee: Square, Inc., San Francisco, CA (US)

( * ) Notice: Subject to any disclaimer, the term of this patent is extended or adjusted under 35 U.S.C. 154(b) by 620 days.

(21) Appl. No.: 15/633,545

(22) Filed: Jun. 26, 2017

(51) Int. Cl.
G06Q 20/40 (2012.01)
G06Q 20/20 (2012.01)
G06Q 20/10 (2012.01)
G06N 20/00 (2019.01)

(52) U.S. Cl.
CPC .......... G06Q 20/401 (2013.01); G06N 20/00 (2019.01); G06Q 20/102 (2013.01); G06Q 20/202 (2013.01)

(58) Field of Classification Search
None
See application file for complete search history.

(56) References Cited

U.S. PATENT DOCUMENTS

| | | | |
|---|---|---|---|
| 5,819,226 A | 10/1998 | Gopinathan et al. | |
| 6,330,546 B1 | 12/2001 | Gopinathan et al. | |
| 7,297,723 B2 | 11/2007 | Wilke et al. | |
| 7,578,438 B2 | 8/2009 | Hogg et al. | |
| 7,596,260 B2 | 9/2009 | Tedesco et al. | |
| 7,620,592 B2 | 11/2009 | O'Mara et al. | |
| 7,653,598 B1 | 1/2010 | Hamilton et al. | |
| 7,668,769 B2 | 2/2010 | Baker et al. | |
| 7,702,583 B1 | 4/2010 | Hamilton et al. | |
| 7,788,195 B1 | 8/2010 | Subramanian et al. | |
| 7,792,405 B2 | 9/2010 | Stoesz et al. | |
| 7,809,617 B1 | 10/2010 | Hamilton et al. | |
| 7,912,773 B1 | 3/2011 | Subramanian et al. | |
| 7,970,701 B2 | 6/2011 | Lewis et al. | |
| 8,005,737 B2 | 8/2011 | Hammad | |

(Continued)

FOREIGN PATENT DOCUMENTS

| | | |
|---|---|---|
| WO | 2014/087179 A1 | 6/2014 |
| WO | 2016/011170 A1 | 6/2016 |

OTHER PUBLICATIONS

Non-Final Office Action dated Aug. 19, 2019, for U.S. Appl. No. 15/665,076, of Matson, K., et al., filed Jul. 31, 2017.

(Continued)

Primary Examiner — Scott A Zare
(74) Attorney, Agent, or Firm — Lee & Hayes, P.C.

(57) ABSTRACT

Techniques for leveraging a likelihood that a transaction (or a portion thereof) will be associated with a refund request to determine whether and/or how long to delay sending, to a payment service, a request for processing the transaction (or portion thereof) are described herein. In an example, a payment processing service may receive, from a point of sale device operated by a merchant, transaction data associated with a transaction between the merchant and a customer. The payment processing service may determine a likelihood that the customer will request a refund for a cost of an item of the transaction at a time after the transaction. Based at least partly on the likelihood, the payment processing service may determine whether to wait until at least the time before sending, to a payment service, a request to process the transaction data for at least the cost of the item.

20 Claims, 7 Drawing Sheets

(56) References Cited

U.S. PATENT DOCUMENTS

| | | |
|---|---|---|
| 8,020,763 B1 | 9/2011 | Kowalchyk et al. |
| 8,027,912 B1 | 9/2011 | Thomas |
| 8,224,723 B2 | 7/2012 | Bosch et al. |
| 8,417,650 B2 | 4/2013 | Graepel et al. |
| 8,676,726 B2 | 3/2014 | Hore et al. |
| 8,885,894 B2 | 11/2014 | Rowen et al. |
| 9,336,494 B1 | 5/2016 | Purpura et al. |
| 9,384,493 B2 | 7/2016 | Harris et al. |
| 9,454,733 B1 | 9/2016 | Purpura et al. |
| 9,508,075 B2 | 11/2016 | Geckle et al. |
| 9,524,501 B2 | 12/2016 | Weber |
| 9,607,336 B1 | 3/2017 | Dean et al. |
| 9,727,869 B1 | 8/2017 | Matson et al. |
| 9,773,227 B2 | 9/2017 | Zoldi et al. |
| 9,836,786 B1 | 12/2017 | Baker |
| 9,842,175 B2 | 12/2017 | Steinberg et al. |
| 9,852,427 B2 | 12/2017 | Caldera |
| 9,888,007 B2 | 2/2018 | Caldera et al. |
| 9,892,465 B2 | 2/2018 | Love et al. |
| 9,898,509 B2 | 2/2018 | Saperstein et al. |
| 9,906,402 B2 | 2/2018 | Ramachandran et al. |
| 9,910,980 B2 | 3/2018 | Kolacinski et al. |
| 9,911,110 B2 | 3/2018 | Scott et al. |
| 9,912,648 B2 | 3/2018 | Taylor, III et al. |
| 10,043,217 B1 | 8/2018 | Bolden et al. |
| 10,062,078 B1 | 8/2018 | Boates et al. |
| 10,068,235 B1 | 9/2018 | Boates et al. |
| 10,636,035 B1 | 4/2020 | Matson et al. |
| 2002/0095360 A1 | 7/2002 | Joao |
| 2002/0120537 A1 | 8/2002 | Morea et al. |
| 2002/0139837 A1 | 10/2002 | Spitz et al. |
| 2003/0187791 A1 | 10/2003 | Weichert et al. |
| 2004/0039693 A1 | 2/2004 | Nauman et al. |
| 2004/0078105 A1 | 4/2004 | Moon et al. |
| 2004/0172360 A1 | 9/2004 | Mabrey et al. |
| 2004/0230527 A1 | 11/2004 | Hansen et al. |
| 2005/0144097 A1 | 6/2005 | Lundberg |
| 2006/0059073 A1 | 3/2006 | Walzak |
| 2007/0011030 A1 | 1/2007 | Bregante et al. |
| 2007/0050840 A1 | 3/2007 | Grandcolas et al. |
| 2007/0094137 A1 | 4/2007 | Phillips et al. |
| 2008/0015985 A1 | 1/2008 | Abhari et al. |
| 2008/0033877 A1 | 2/2008 | Blair et al. |
| 2008/0040261 A1 | 2/2008 | Nix et al. |
| 2008/0140564 A1 | 6/2008 | Tal et al. |
| 2008/0235123 A1 | 9/2008 | Olliphant et al. |
| 2008/0288405 A1 | 11/2008 | John |
| 2009/0094125 A1 | 4/2009 | Killian et al. |
| 2009/0164325 A1 | 6/2009 | Bishop et al. |
| 2009/0164326 A1 | 6/2009 | Bishop et al. |
| 2009/0164328 A1 | 6/2009 | Bishop et al. |
| 2009/0164329 A1 | 6/2009 | Bishop et al. |
| 2009/0164331 A1 | 6/2009 | Bishop et al. |
| 2009/0287564 A1 | 11/2009 | Bishop et al. |
| 2009/0307028 A1 | 12/2009 | Eldon et al. |
| 2010/0169170 A1* | 7/2010 | Fordyce, III ........... G06Q 30/00 705/14.17 |
| 2010/0305976 A1 | 12/2010 | Fischer et al. |
| 2011/0022516 A1 | 1/2011 | Gao et al. |
| 2011/0137789 A1 | 6/2011 | Kortina et al. |
| 2011/0159846 A1 | 6/2011 | Kemshall |
| 2011/0313835 A1 | 12/2011 | Falkenborg et al. |
| 2012/0158566 A1 | 6/2012 | Fok et al. |
| 2012/0185398 A1 | 7/2012 | Weis et al. |
| 2012/0303425 A1 | 11/2012 | Katzin et al. |
| 2013/0138563 A1 | 5/2013 | Gilder et al. |
| 2013/0139222 A1 | 5/2013 | Kirillin et al. |
| 2013/0253956 A1 | 9/2013 | Towne et al. |
| 2013/0275308 A1 | 10/2013 | Paraskeva et al. |
| 2013/0311369 A1 | 11/2013 | Elrod et al. |
| 2013/0346142 A1 | 12/2013 | Young |
| 2014/0074717 A1 | 3/2014 | Evans |
| 2014/0156531 A1 | 6/2014 | Poon et al. |
| 2014/0156568 A1 | 6/2014 | Ganguly et al. |
| 2014/0164154 A1 | 6/2014 | Ramaci |
| 2014/0222616 A1 | 8/2014 | Siemiatkowski et al. |
| 2014/0244491 A1 | 8/2014 | Eberle et al. |
| 2014/0288989 A1 | 9/2014 | Goeppinger |
| 2015/0006393 A1 | 1/2015 | Allin et al. |
| 2015/0012738 A1* | 1/2015 | Shah ................. H04L 9/3236 713/2 |
| 2015/0112866 A1 | 4/2015 | Muthu et al. |
| 2015/0161609 A1 | 6/2015 | Christner |
| 2015/0186841 A1* | 7/2015 | Sar ................. G06Q 10/0837 705/304 |
| 2015/0220920 A1 | 8/2015 | Howe |
| 2015/0235207 A1 | 8/2015 | Murphy, Jr. et al. |
| 2015/0235208 A1 | 8/2015 | Murphy et al. |
| 2015/0242835 A1* | 8/2015 | Vaughan ................. G06Q 20/22 705/39 |
| 2016/0117676 A1 | 4/2016 | Jiang et al. |
| 2016/0379216 A1* | 12/2016 | Wang .................. G06Q 20/407 705/44 |
| 2017/0083878 A1 | 3/2017 | Conrad et al. |
| 2017/0109748 A1 | 4/2017 | Kote |
| 2017/0116674 A1 | 4/2017 | Howe et al. |
| 2017/0132624 A1 | 5/2017 | Muchang et al. |
| 2017/0178134 A1* | 6/2017 | Senci .................... G06Q 40/02 |
| 2017/0278089 A1 | 9/2017 | Kothari et al. |
| 2018/0060839 A1* | 3/2018 | Murali ............... G06Q 20/4016 |
| 2018/0197175 A1* | 7/2018 | Groarke ................ G06Q 20/12 |
| 2018/0303577 A1 | 10/2018 | Sweeney et al. |
| 2020/0090152 A1 | 3/2020 | Kumar et al. |
| 2020/0258065 A1 | 8/2020 | Matson et al. |

OTHER PUBLICATIONS

Non-Final Office Action dated Oct. 1, 2019, for U.S. Appl. No. 15/665,355, of Mullins, B., et al., filed Jul. 31, 2017.
"3.2.4.3.1. sklearn.ensemble.RandomForestClassifier," Scikit Learn, Retrieved from the Internet URL: http://scikit-learn.org/stable/modules/generated/sklearn.ensemble.RandomForestClassifier.html, on Mar. 14, 2016, pp. 1-11.
Breiman, L., "Random Forests," University of California, Berkeley, dated Jan. 2001, pp. 1-32.
Non-Final Office Action dated Feb. 17, 2016, for U.S. Appl. No. 14/732,191, of Matson, K., et al., filed Jun. 5, 2015.
Final Office Action dated Aug. 17, 2016, for U.S. Appl. No. 14/732,191, of Matson, K., et al., filed Jun. 5, 2015.
Notice of Allowance dated Apr. 4, 2017, for U.S. Appl. No. 14/732,191, of Matson, K, et al., filed Jun. 5, 2015.
Non-Final Office Action dated Apr. 11, 2017, for U.S. Appl. No. 14/332,169, of Taylor, J.M., et al., filed Jul. 15, 2014.
Notice of Allowance dated Oct. 20, 2017, for U.S. Appl. No. 14/332,169, of Taylor, J.M., et al., filed Jul. 15, 2014.
Notice of Allowance dated Apr. 25, 2018, for U.S. Appl. No. 15/181,962, of Boates, B., et al., filed Jun. 14, 2016.
Notice of Allowance dated Apr. 25, 2018, for U.S. Appl. No. 15/182,033, of Boates, B., et al., filed Jun. 14, 2016.
International Search Report and Written Opinion for PCT Application No. PCT/US2015/40601, dated Sep. 25, 2015.
Notice of Allowance dated Dec. 17, 2019, for U.S. Appl. No. 15/665,076, of Matson, K, et al., filed Jul. 31, 2017.
Final Office Action dated May 6, 2020, for U.S. Appl. No. 15/665,355, of Mullins, B., et al., filed Jul. 31, 2017.
Advisory Action dated Jul. 13, 2020, for U.S. Appl. No. 15/665,355, of Mullins,B., et al., filed Jul. 31, 2017.
Non-Final Office Action dated Oct. 22, 2020, for U.S. Appl. No. 16/986,029, of Mullins, B., et al., filed Aug. 5, 2020.

* cited by examiner

INTERCHANGE ACTION DELAY BASED ON REFUND PREDICTION

BACKGROUND

Card-based payment transactions may involve fees. For instance, an interchange fee is a fee paid by a merchant for the acceptance of card-based transactions. In a credit card or debit card transaction involving a merchant, the card-issuing bank may deduct an interchange fee from the amount that it pays the acquiring bank and/or processor that handles the credit card or debit card transaction on behalf of the merchant. The acquiring bank and/or processor then pays the merchant the amount of the transaction less the interchange fee and any additional fees charged by the acquiring bank and/or processor for handling the transaction.

In some examples, the interchange fee may be made up of multiple fees. For instance, processing card-based transactions may involve various steps such as authorization, capture, and settlement, each which may be associated with a fee. Authorization is the first step in processing a card-based transaction. Upon receiving payment data associated with a transaction, a merchant may request authorization of the payment data for a particular amount (e.g., the cost of the transaction). No funds are moved during this part of the process but a hold is placed on the payment data for the particular amount. Generally, a merchant has a predetermined period of time to procure the funds. A capture may be the second step in processing a card-based transaction. Merchants typically perform captures for multiple transactions at the same time, often at a particular time of day (e.g., close of business), particular frequency, etc. A capture initiates the transfer of funds to a merchant's account (i.e., settlement). Generally, a merchant has a predetermined period of time to capture funds without incurring a penalty. Not all transactions require capture to initiate settlement. Settlement occurs when funds have been transferred from the cardholder's (e.g., the customer's) account to the merchant's account.

The steps involved in processing a card-based transaction may vary based on whether a transaction is a single message transaction or a dual message transaction. For instance, in a single message transaction, a merchant sends an authorization request and need not separately capture to settle the transaction. Single message transactions are commonly associated with card-based transactions that require customers to enter personal identification numbers (PIN) which are verified in real-time by the card-issuing bank(s). In a dual message transaction, a merchant may send an authorization request for a transaction and then send a separate capture request to initiate settlement of the transaction. Dual message transactions are commonly associated with card-based transactions that do not require customers to enter PINs, but instead require customers to sign at the point of sale. Accordingly, interchange fees associated with single message transactions and dual message transactions may be different.

Additional and/or alternative fees may also accompany card-based transactions. For instance, in addition to interchange fees, in some examples, merchants may be assessed a fee for processing a refund. A refund (or credit) adds previously settled funds back to a cardholder's (e.g., the customer's) account. In other examples, in addition to interchange fees, merchants may pay network fees to card networks (e.g., VISA®, MASTERCARD®, etc.). Moreover, in some examples, merchants may pay processing fees to their acquiring bank and/or processor.

BRIEF DESCRIPTION OF THE DRAWINGS

The above and other features of the present disclosure, its nature and various advantages, will be more apparent upon consideration of the following detailed description, taken in conjunction with the accompanying drawings in which.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

A payment processing service may process payments between merchant(s) and customer(s). In at least one example, a payment processing service may offer point-of-sale (POS) systems which are associated with various applications of the payment processing service that ease POS interactions with customers. A POS system may include a POS terminal and a payment reader. The payment reader may physically interact with payment instruments such as magnetic stripe payment cards, EMV payment cards, and short-range communication (e.g., near field communication (NFC), radio frequency identification (RFID), Bluetooth®, Bluetooth® low energy (BLE), etc.) payment instruments. The POS terminal may provide a rich user interface, communicate with the payment reader, and also communicate with a server associated with the payment processing service. In this manner, the POS terminal and payment reader may collectively process transaction(s) between a merchant and customer(s) via the payment processing service. Additionally, in some examples, the payment processing service may process transaction(s) associated with POS interactions between customer(s) and a website of the merchant that is associated with various applications of the payment processing service.

Figure 1:
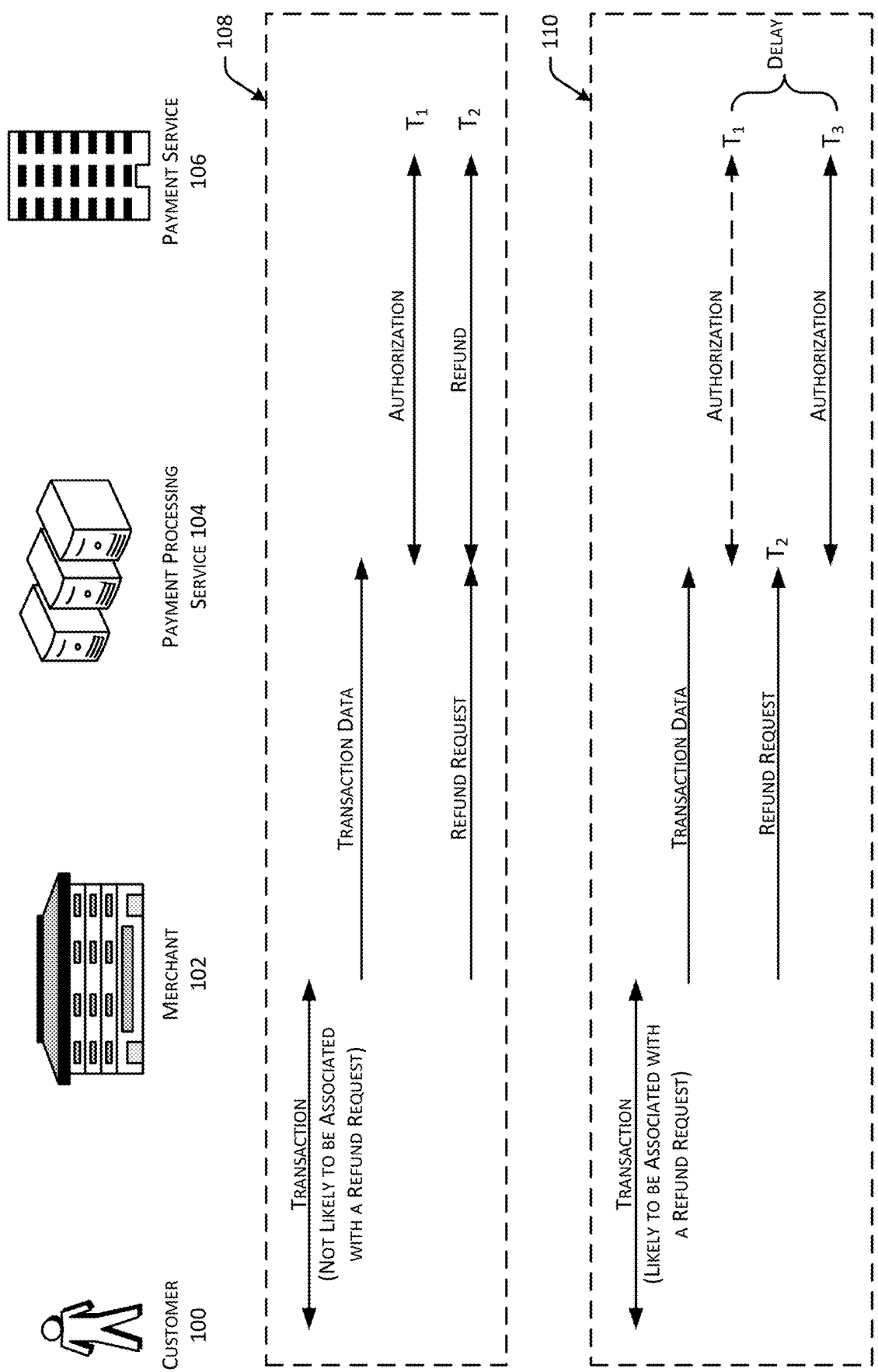
FIG. 1 depicts a diagram illustrating delaying an authorization request for a single message transaction based on the transaction being likely to be associated with a refund request.
Figure 2:
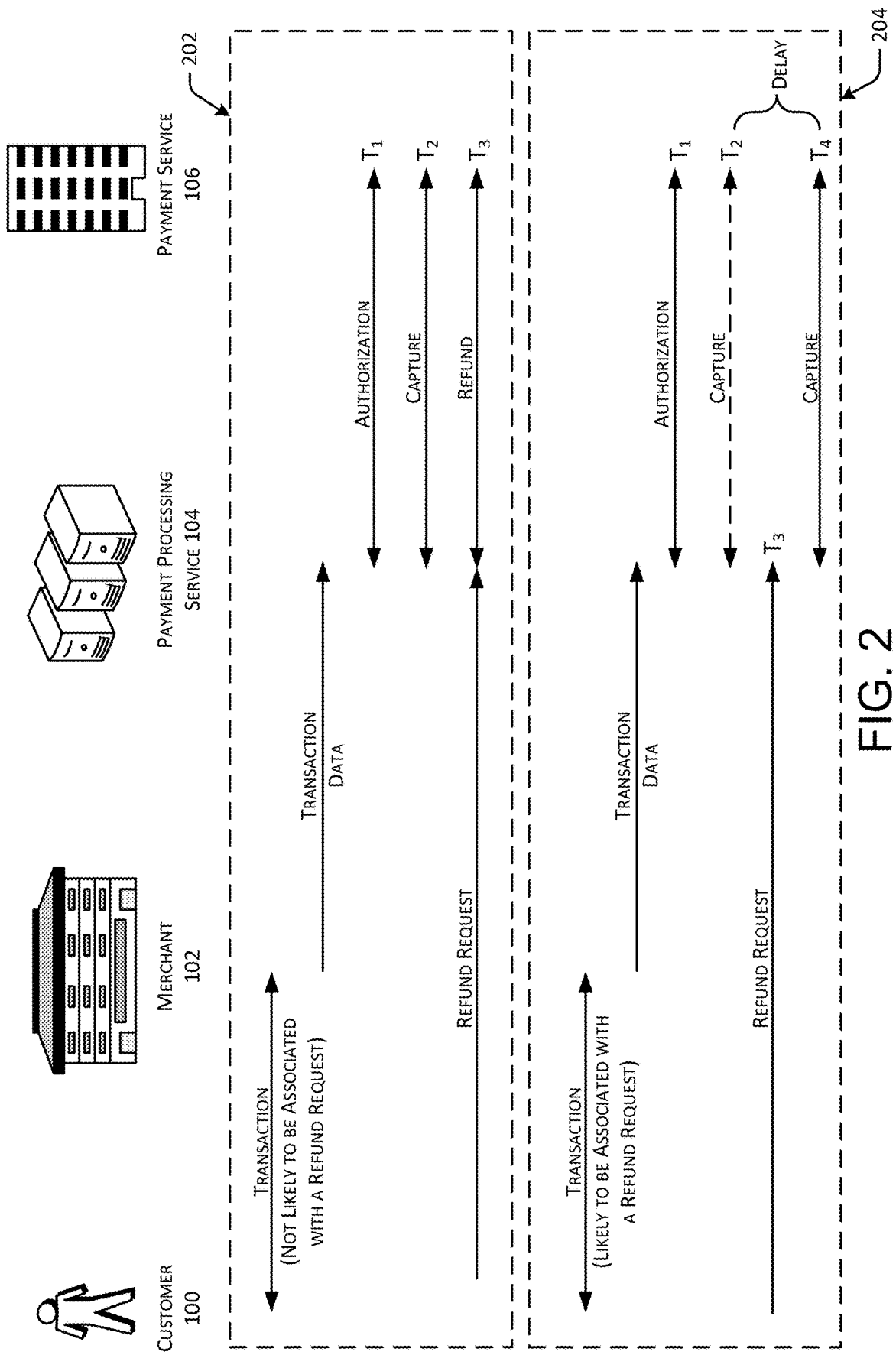
FIG. 2 depicts a diagram illustrating delaying a capture request for a dual message transaction based on the transaction being likely to be associated with a refund request.

In at least one example, the payment processing service may incur fees associated with processing transactions. That is, payment service(s) may impose fees on payment processing service(s) for processing transactions. For instance, the payment processing service may incur interchange fees, as described above, for processing transactions on behalf of merchants. Additionally, in some examples, the payment processing service may incur fees for processing refund requests on behalf of merchants. For the purpose of this discussion, a refund request may be a request for a cost of at least a portion of a transaction to be added back to a customer's account. Techniques described herein are directed to determining when at least a portion of a transaction is likely to be associated with a refund request and making decisions with respect to processing transactions based on the likelihood that at least a portion of a transaction will be associated with a refund request. FIGS. 1 and 2 illustrate non-limiting examples of delaying aspects of processing a transaction based on the transaction being likely to be associated with a refund request. FIG. 1 is directed to a single message transaction. FIG. 2 is directed to a dual message transaction.

In FIGS. 1 and 2, customer 100 participates in a transaction with merchant 102. For the purpose of this discussion, merchant 102 may be any entity that offers items (e.g., goods, services, etc.) for acquisition (e.g., sale, rent, lease, etc.). In at least one example, merchant 102 may subscribe to services offered by payment processing service 104. For the purpose of this discussion, payment processing service 104 may be any entity that processes transactions between merchant(s) and customer(s). As described above, in at least one example, a payment processing service may offer POS systems which are associated with various applications that ease POS interactions with customers (e.g., customer 100). In at least one example, payment processing service 104 may send communications to payment service 106. For the purpose of this discussion, payment service 106 may be a card payment network, a card-issuing bank, an acquiring bank, etc.

FIG. 1 illustrates two scenarios, a first scenario 108 and a second scenario 110, associated with a single message transaction. As shown in FIG. 1, in the first scenario 108, customer 100 may transact with merchant 102. For instance, customer 100 may purchase a good (e.g., coffee, apparel, etc.) or service (e.g., massage, plumbing project, etc.) from merchant 102. Techniques described herein may determine that the transaction is not likely to be associated with a refund request. That is, techniques described herein may determine that the likelihood of the transaction being associated with a refund request is below a predetermined threshold. Merchant 102 (e.g., a POS terminal or other device operated by merchant 102) may send transaction data associated with the transaction to payment processing service 104. The transaction data may include payment data associated with the payment instrument used by customer 100, customer authentication data, and/or other point-of-purchase data.

Payment data may include a name of customer 100, an address of customer 100, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to customer 100 (which may or may not match the number associated with the payment instrument), restrictions on what types of charges/debts may be made, etc. Customer authentication data may include data authenticating the customer, such as a password, a personal identification number (PIN), a signature, a biometric indicator, etc. Point-of-purchase data may include data identifying merchant 102, data indicating a cost of the transaction, data indicating item(s) purchased via the transaction, a timestamp associated with the transaction, a datestamp associated with the transaction, etc.

Payment processing service 104 may receive the transaction data and may send an authorization request to payment service 106. In at least one example, the authorization request may be based on the transaction data. For instance, the authorization request may be a request to authorize the payment instrument for the cost of the transaction. The authorization request may occur at a first time ($T_1$). In at least one example, there may be an interchange fee associated with the authorization request. In response to the authorization request, payment service 106 may send an indication whether the payment instrument is authorized for the cost of the transaction. For the purpose of FIG. 1, the authorization request is approved. That is, the payment data is authorized for the cost of the transaction. In a single-message transaction, such as the transaction illustrated in FIG. 1, payment processing service 104 need not send any other requests (e.g., capture, etc.) to settle the transaction. That is, based on the payment data being authorized for the cost of the transaction, payment service 106 may initiate the transfer of funds from the account of customer 100 to the account of merchant 102 without further action from payment processing service 104.

At a second time ($T_2$) after payment processing service 104 sends the authorization request and receives an indication that the payment instrument is authorized for the cost of the transaction, customer 100 may return the good to merchant 102 or otherwise request a refund for the cost of the transaction. Merchant 102 may send a refund request to payment processing service 104 for the cost of the transaction. Payment processing service 104 may process the refund request on behalf of merchant 102. For instance, payment processing service 104 may send a refund request to payment service 106 and payment service 106 may send an indication to payment processing service 104 that the refund request has been received and is being processed. In at least one example, payment processing service 104 may incur a fee for requesting the refund after payment processing service 104 has sent an authorization request. Accordingly, based at least in part on processing the transaction at the first time and requesting the refund at the second time, payment processing service 104 may have to pay both the interchange fee and the refund fee. The terms and amounts of the fees may be determined based on agreements between payment processing service 104 and payment service 106.

In the second scenario 110, customer 100 may transact with merchant 102. For instance, customer 100 may purchase a good (e.g., coffee, apparel, etc.) or service (e.g., massage, plumbing project, etc.) from merchant 102. Techniques described herein may determine that the transaction is likely to be associated with a refund request. That is, techniques described herein may determine that the likelihood of the transaction being associated with a refund request is above a predetermined threshold. Merchant 102 (e.g., a POS terminal or other device operated by merchant 102) may send transaction data, as described above, associated with the transaction to payment processing service 104. Payment processing service 104 may receive the transaction data and, based on the transaction being likely to be associated with a refund request, payment processing service 104 may refrain from sending an authorization request to payment service 106 at the first time. Instead, payment processing service 104 may determine to delay sending the authorization request until a third time ($T_3$). Techniques described herein are further directed to determining whether to delay sending the authorization request and/or how long to delay sending the authorization request.

At the second time, customer 100 may return the good to merchant 102 or otherwise request a refund for the cost of the transaction. Merchant 102 may send a refund request to payment processing service 104 for the cost of the transaction. Because payment processing service 104 has not yet sent the authorization request, payment processing service 104 may not need to send a refund request to payment service 106. As a result, payment processing service 104 may avoid imposition of the refund fee associated with the refund request. That is, when payment processing service 104 sends the authorization request (e.g., at the third time), payment processing service 104 may incur the interchange fee associated with the authorization request, but payment processing service 104 may avoid paying the refund fee. As such, the second scenario 110 results in a savings to payment processing service 104. That is, determining to delay sending an authorization request based on the likelihood that a transaction will be associated with a refund request may result in a cost savings to payment processing service 104.

FIG. 2 illustrates two scenarios, a first scenario 202 and a second scenario 204, associated with a dual message transaction. As shown in FIG. 2, in the first scenario 202, customer 100 may transact with merchant 102. For instance, customer 100 may purchase a good (e.g., coffee, apparel, etc.) or service (e.g., massage, plumbing project, etc.) from merchant 102. Techniques described herein may determine that the transaction is not likely to be associated with a refund request. That is, techniques described herein may determine that the likelihood of the transaction being associated with a refund request is below a predetermined threshold. Merchant 102 (e.g., a POS terminal or other device operated by merchant 102) may send transaction data, as described above, associated with the transaction to payment processing service 104.

Payment processing service 104 may receive the transaction data and may send an authorization request to payment service 106. In at least one example, the authorization request may be based on the transaction data. For instance, the authorization request may be a request to authorize the payment instrument for the cost of the transaction. The authorization request may occur at a first time ($T_1$). In at least one example, there may be an interchange fee associated with the authorization request. In response to the authorization request, payment service 106 may send an indication whether the payment instrument is authorized for the cost of the transaction. For the purpose of FIG. 2, the authorization request is approved. That is, the payment card data is authorized for the cost of the transaction.

In a dual-message transaction, such as the transaction illustrated in FIG. 2, payment processing service 104 may send a second request (e.g., a capture request) to initiate settlement of the transaction. Payment processing service 104 may send the capture request at a second time ($T_2$). The capture request may be to capture the cost of the transaction. In at least one example, there may be an additional interchange fee associated with the capture request. In response to the capture request, payment service 106 may send an indication that the settlement process has been initiated.

At a third time ($T_3$) after payment processing service 104 sends the capture request, customer 100 may return the good to merchant 102 or otherwise request a refund for the cost of the transaction. Merchant 102 may send a refund request to payment processing service 104 for the cost of the transaction. Payment processing service 104 may process the refund request on behalf of merchant 102. For instance, payment processing service 104 may send a refund request to payment service 106 and payment service 106 may send an indication to payment processing service 104 that the refund request has been received and is being processed. In at least one example, payment processing service 104 may incur a fee for requesting the refund after payment processing service 104 has sent a request to capture. Accordingly, based at least in part on sending the authentication request at the first time, sending the capture request at the second time, and requesting the refund at the third time, payment processing service 104 may have to pay both the interchange fee (associated with the authorization request and capture request) and the refund fee. As described above, the terms and amounts of the fees may be determined based on agreements between payment processing service 104 and payment service 106.

In the second scenario 204, customer 100 may transact with merchant 102. For instance, customer 100 may purchase a good (e.g., coffee, apparel, etc.) or service (e.g., massage, plumbing project, etc.) from merchant 102. Techniques described herein may determine that the transaction is likely to be associated with a refund request. That is, techniques described herein may determine that the likelihood of the transaction being associated with a refund request is above a predetermined threshold. Merchant 102 (e.g., a POS terminal or other device operated by merchant 102) may send transaction data, as described above, associated with the transaction to payment processing service 104. Payment processing service 104 may receive the transaction data and payment processing service 104 may send an authorization request to payment service 106 at the first time. However, based on the transaction being likely to be associated with a refund request, payment processing service 104 may determine to delay sending the capture request until a fourth time ($T_4$). Techniques described herein are further directed to determining whether to delay sending the capture request and/or how long to delay sending the capture request.

At the third time, customer 100 may return the good to merchant 102 or otherwise request a refund for the cost of the transaction. Merchant 102 may send a refund request to payment processing service 104 for the cost of the transaction. Because payment processing service 104 has not yet sent the capture request, payment processing service 104 may not need to send a refund request to payment service 106. As a result, payment processing service 104 may avoid imposition of the refund fee associated with the refund request. That is, when payment processing service 104 sends the capture request (e.g., at the fourth time), payment processing service 104 may incur the interchange fee associated with the capture request (and the authorization request), but payment processing service 104 may avoid paying the refund fee. As such, the second scenario 110 results in a savings to payment processing service 104. That is, determining to delay sending a capture request based on the likelihood that a transaction will be associated with a refund request may result in a cost savings to payment processing service 104.

While the aforementioned scenarios 108 and 110 are described in the context of a single message transaction, and scenarios 202 and 204 are described in the context of a dual message transaction, in some examples, payment processing service 104 may determine to delay sending an authorization request in a dual message transaction, similar to scenarios 108 and 110. That is, in some examples, payment processing service 104 may determine that a transaction is likely to be associated with a refund request and accordingly, may not send an authorization request without regard to whether the transaction is a single message transaction or a dual message transaction. In examples where the transaction is a dual message transaction, payment processing service 104 may incur additional risk by delaying the authorization request.

FIGS. 1 and 2 convey techniques described herein. It should be mentioned that, in some examples, additional and/or alternative fees may be incurred by merchant 102 and/or payment processing service 104 in processing the transaction, which are not shown or described above. For instance, in some examples, payment processing service 104 may void an authorization request and may incur a fee for voiding the authorization request. Furthermore, in addition to interchange fees, payment processing service 104 may pay network fees to card networks (e.g., VISA®, MASTERCARD®, etc.) and/or acquiring bank and/or processors. Moreover, in some examples, merchant 102 may pay processing fees to an additional and/or alternative acquiring bank and/or processor.

As described above with reference to FIGS. 1 and 2, techniques described herein are directed to determining whether and/or when to delay sending a transaction processing request based on a likelihood that a transaction will be associated with a refund request. In some examples, as described herein, techniques are directed to determining individual item(s) associated with a transaction that are likely to be associated with a refund request and may determine to delay sending a transaction processing request associated with a portion of a transaction based on said determination. As described above, techniques described herein enable payment processing service providers to reduce the number and amount of fees paid in handing transactions wherein at least a portion of the transaction is associated with a refund request.

In addition to the cost savings described above, techniques described herein provide various computational efficiencies as well. For instance, by refraining from sending capture requests and refund requests, techniques described herein reduce the number of communications exchanged between payment processing service 104 and payment service 106. That is, techniques described herein reduce network usage and therefore increase network bandwidth. Furthermore, server(s) associated with payment processing service 104 conserve resources by reducing the need to generate and send communications to payment service 106. As such, techniques described herein are directed to improvements to a computing system.

Figure 3:
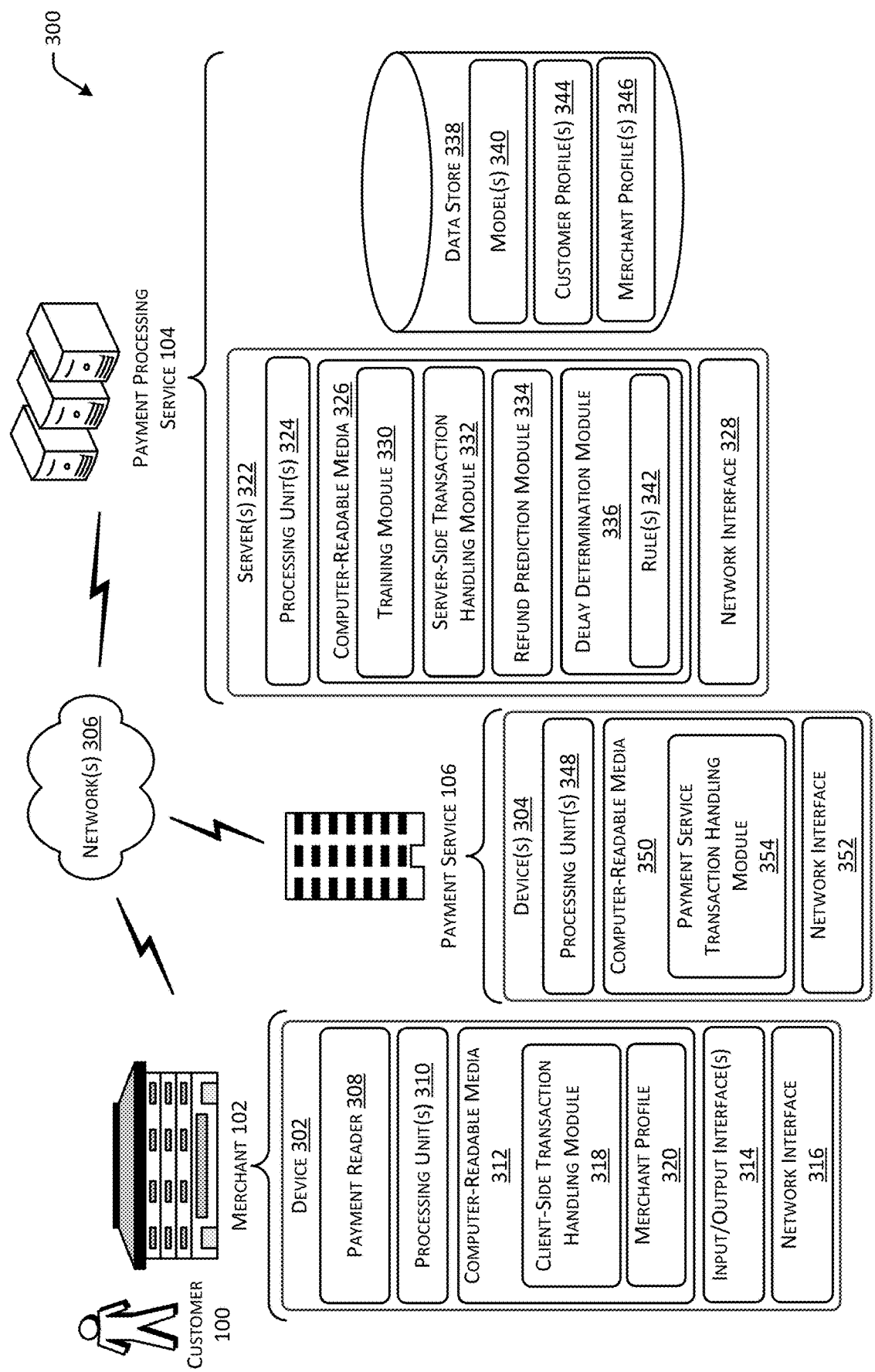
FIG. 3 depicts an illustrative block diagram of a system associated with determining whether and/or when to delay sending a request to process at least a portion of a transaction in accordance with some examples of the present disclosure.

FIG. 3 depicts an illustrative block diagram of system 300 associated with determining whether and/or when to delay sending a request to process at least a portion of a transaction in accordance with some examples of the present disclosure. System 300 may include device 302 operated by merchant 102, which is communicatively coupled to payment processing service 104 and/or device 304 operated by payment service 106 via network(s) 306.

Merchant 102 may operate device 302. As described above, a merchant, e.g., merchant 102, may be any individual, company, service provider, etc. that offers items for acquisition by customer(s). An item may be a good or a service. Customer 100 may acquire an item by purchasing the item, renting the item, leasing the item, etc. In some examples, merchant 102 (i.e., an agent of merchant 102) that subscribes to services available by payment processing service 104 may interact with device 302 to process transactions and/or manage other aspects of the merchant's business via services available by payment processing service 104.

Device 302 may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc. In at least one example, device 302 may be a POS terminal, which may be connected to payment reader 308. That is, in at least one example, device 302 may be associated with a POS system. In such an example, payment reader 308 may be capable of accepting a variety of payment instruments, such as credit cards, debit cards, gift cards, short-range communication based payment instruments, and the like. In one example, payment reader 308 may be a wireless communication device that communicates wirelessly with device 302, for example, using Bluetooth®, BLE, NFC, RFID, etc. In another example, payment reader 308 may be coupled to device 302, for example, by being insertable into a connector mechanism (e.g., phone jack, headphone jack, etc.) of a smart phone or tablet. That is, in other examples, payment reader 308 may be coupled to device 302 via a wired connection. In additional and/or alternative examples, payment reader 308 may be integral to device 302, as shown in FIG. 3. Payment reader 308 may interact with a payment instrument via a tap, dip, or swipe to obtain payment data associated with a payment instrument of customer 100.

In at least one example, payment reader 308 may include a reader chip and/or a transaction chip which may enable payment reader 308 to control the operations and processing of payment reader 308. In an example, the reader chip may perform functionality to control payment interfaces (e.g., a contactless interface, a contact interface, etc.), a wireless communication interface, a wired interface, a power supply, a user interface (e.g., a signal condition device (FPGA)), etc. Additionally and/or alternatively, the transaction chip may perform functionality relating to processing of payment transactions, interfacing with payment instruments, cryptography, and other payment-specific functionality. That is, the transaction chip may access payment data associated with a payment instrument. The payment data may include a name of the customer, an address of the customer, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to the customer (which may or may not match the number associated with the payment instrument), restrictions on what types of charges/debts may be made, etc., as described above. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionality of reader chip and transaction chip may be embodied in a single chip or a plurality of chips, each including any suitable combination of processing units and computer-readable media to collectively perform the functionalities of reader chip and transaction chip as described herein.

Device 302 may include processing unit(s) 310, computer-readable media 312, input/output interface(s) 314, and network interface 316. Processing unit(s) 310 of device 302 may execute one or more modules and/or processes to cause device 302 to perform a variety of functions, as set forth above and explained in further detail in the following disclosure. In some examples, processing unit(s) 310 may include a central processing unit (CPU), a graphics processing unit (GPU), both CPU and GPU, or other processing units or components known in the art. Additionally, each of processing unit(s) 310 may possess its own local memory, which also may store program modules, program data, and/or one or more operating systems. Depending on the exact configuration and type of device 302, computer-readable media 312 may include volatile memory (such as RAM), non-volatile memory (such as ROM, flash memory, miniature hard drive, memory card, or the like), or some combination thereof. In various examples, device 302 may include input/output interface(s) 314. Examples of input/output interface(s) 314 may include a keyboard, a mouse, a pen, a voice input device, a touch input device, a display, etc. Furthermore, device 302 may include network interface 316 for interfacing with network(s) 306, as described below.

In at least one example, computer-readable media 312 may include one or more modules to enable a merchant, e.g., merchant 102, to manage its business via interactions with payment processing service 104. The one or more modules may be implemented as more modules or as fewer modules, and functions described for the modules may be redistributed depending on the details of the implementation. For the purpose of this discussion, the term "module" refers broadly to software stored on non-transitory storage medium (e.g., volatile or non-volatile memory for a computing device), hardware, or firmware (or any combination thereof) modules. Modules are typically functional such that they may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 310) to configure device 302 to execute instructions and to perform operations described herein. The module(s) may include client-side transaction handling module 318. In some examples, client-side transaction handling module 318 may be associated with a POS application. In at least one example, computer-readable media 312 may also include merchant profile 320.

Client-side transaction handling module 318 may receive payment data from payment reader 308, described above. In addition to payment data, client-side transaction handling module 318 may receive customer authentication data and/or other point-of-purchase data from payment reader 308. As described above, customer authentication data may include data authenticating the customer, such as a password, a PIN, a signature, a biometric indicator, etc. Point-of-purchase data may include data identifying merchant 102, data indicating a cost of the transaction, data indicating item(s) purchased via the transaction, a timestamp associated with the transaction, a datestamp associated with the transaction, etc. The payment data, the customer authentication data, and/or the point-of-purchase data may be associated with transaction data, as described above.

Client-side transaction handling module 318 may exchange communications with payment processing service 104. For instance, in one example, client-side transaction handling module 318 may provide transaction data to payment processing service 104. Additionally, client-side transaction handling module 318 may receive notifications from payment processing service 104 signaling the success (e.g., authorization) or failure (e.g., declination) of authorization requests of the payment data for various transactions. In some examples, client-side transaction handling module 318 may generate user interfaces for presentation via an output interface of input/output interface(s) 314, described above. In some examples, the user interfaces may communicate that a transaction was successful (i.e., payment data is authorized for the transaction), unsuccessful (i.e., payment data is not authorized for the transaction), or requires more information to proceed. In an example where a transaction requires more information to proceed, a user interface may be configured to prompt merchant 102 and/or customer 100 for additional information to complete a transaction. In such an example, the user interface may be presented via input/output interface(s) 314.

In at least one example, client-side transaction handling module 318 may enable merchant 102 to process a refund request. A refund may cause funds to be added back to an account of customer 100. In at least one example, client-side transaction handling module 318 may receive an indication that customer 100 requests a refund and client-side transaction handling module 318 may send a request associated with the refund to payment processing service 104. In such examples, client-side transaction handling module 318 may receive notification(s) from payment processing service 104 signaling the success or failure of the refund request. In some examples, client-side transaction handling module 318 may generate user interfaces for presentation via an output interface of input/output interface(s) 314, described above.

Merchant profile 320 may store data associated with a merchant (e.g., merchant 102) including, but not limited to, data including information about merchant 102 (e.g., name of the merchant, geographic location of the merchant, types of goods or services offered by the merchant, operating hours of the merchant, a merchant identifier, a merchant category classification, etc.), information about events associated with merchant 102 (e.g., past and upcoming events, dates of events, locations of events, etc.), accounting information associated with merchant 102 (e.g., bank(s) that the merchant banks with, etc.), contractual information associated with merchant 102 (e.g., terms of a contract between the merchant and the payment processing service), transactional information associated with merchant 102 (e.g., transactions conducted by the merchant, goods and/or service associated with the transactions, total spends of each of the transactions, parties to the transactions, dates, times, and/or locations associated with the transactions, refunds associated with transaction(s), etc.), etc. Data stored in merchant profile 320 may be called merchant data. In some examples, at least a portion of merchant profile 320 may be stored in data store 338, as described below.

As described above, device 302 may communicate with payment processing service 104 via network(s) 306. Payment processing service 104 may include one or more servers 322. Server(s) 322 may include processing unit(s) 324, computer-readable media 326, and network interface 328. The processing unit(s) 324 of server(s) 322 may execute one or more modules and/or processes to cause server(s) 322 to perform a variety of functions, as set forth above and explained in further detail in the following disclosure. In some examples, the processing unit(s) 324 may include a CPU, a GPU, both CPU and GPU, or other processing units or components known in the art. Additionally, each of the processing unit(s) 324 may possess its own local memory, which also may store program modules, program data, and/or one or more operating systems. Depending on the exact configuration and type of server(s) 322, computer-readable media 326 may include volatile memory (such as RAM), non-volatile memory (such as ROM, flash memory, miniature hard drive, memory card, or the like), or some combination thereof. Server(s) 322 may include network interface 328 for interfacing with network(s) 306, as described below.

In at least one example, computer-readable media 326 may include one or more modules for processing transactions. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they may generate useful data or other output using specified input(s). A module may or may not be self-contained. An application program (also called an "application") may include one or more modules, or a module may include one or more application programs. In some examples, a module may include an API to perform some or all of its functionality (e.g., operations). In additional and/or alternative examples, the module(s) may be implemented as computer-readable instructions, various data structures, and so forth via at least one processing unit (e.g., processing unit(s) 324) to configure server(s) 322 to execute instructions and to perform operations described herein. The module(s) may include training module 330, server-side transaction handling module 332, refund prediction module 334, and delay determination module 336.

Training module 330 may be configured to train data model(s). In an example, training module 330 may train a data model for determining one or more scores associated with likelihood(s) that at least a portion of a transaction will be associated with a refund request. In at least one example, training module 330 may utilize a machine learning mechanism to build, modify, or otherwise utilize a data model that is created from example inputs and makes predictions or decisions. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

In at least one example, training module 330 may access training data. The training data may include data associated with a plurality of previous transactions. In an example, a training data item may include data identifying merchant data, customer data, and transaction data associated with a transaction, and data indicating whether and/or when the transaction was associated with a refund request. Training module 330 may train a data model based on a plurality of training data items such that, given a new input of merchant data, customer data, and/or transaction data associated with a transaction, the data model may output one or more scores indicative of a likelihood that the transaction will be associated with a refund request. In some examples, as described below, a score may be associated with a particular time or time interval after a transaction. In at least one example, training module 330 may provide the data model to data store 338 associated with payment processing service 104 and the data model may be stored in a database associated with model(s) 340.

Training module 330 may receive updated training data for iteratively training and updating the data model(s). Additional details associated with training data model(s) are described below with reference to FIG. 4.

Server-side transaction handling module 332 may receive transaction data from device 302, as described above, and may facilitate processing transactions using the transaction data. As described above, the transaction data may include payment data, customer authentication data, and/or point-of-purchase data. Additionally and/or alternatively, server-side transaction handling module 332 may receive refund request(s) from device 302. In at least one example, server-side transaction handling module 332 may exchange communications with payment service 106. That is, server-side transaction handling module 332 may send authorization request(s), capture request(s), refund request(s), etc. to payment service 106 and, in some examples, server-side transaction handling module 332 may receive communication(s) indicating whether such request(s) are approved, processing, etc. Responsive to receiving communication(s) from payment service 106, server-side transaction handling module 332 may send communication(s) to device 302.

Refund prediction module 334 may determine whether a transaction is likely to be associated with a refund request and, in some examples, a timing associated with the refund request. In at least one example, refund prediction module 334 may access a data model from model(s) 340 stored in data store 338, and may apply the data model to transaction data associated with a transaction, customer data associated with customer 100 of the transaction, and/or merchant data associated with merchant 102 of the transaction. That is, refund prediction module 334 may leverage transaction data, customer data, and/or merchant data to determine whether a transaction is likely to be associated with a refund request and, in some examples, a timing associated with the refund request.

In some examples, refund prediction module 334 may output a binary prediction regarding whether a transaction is likely to be associated with a refund request (e.g., yes or no), which may be based on a likelihood of a transaction being associated with a refund request being above (or below) a predetermined threshold. Or, refund prediction module 334 may output a score indicating a likelihood that a transaction will be associated with a refund request. In some examples, the score may be a percentage, a probability, or some other indicator of a likelihood that a transaction will be associated with a refund request. In at least one example, a score above a threshold may be indicative that customer 100 is likely to request a refund and a score below the threshold may be indicative that customer 100 is not likely to request a refund. In at least one example, refund prediction module 334 may indicate a time associated with a refund request. In an additional and/or alternative example, refund prediction module 334 may output a score associated with a time and/or time interval after a time of the transaction (e.g., transaction time).

In some examples, refund prediction module 334 may output one or more scores associated with one or more times or time intervals. For instance, in at least one example, refund prediction module 334 may determine a first score associated with a first time (e.g., one hour) after the transaction time, a second score associated with a second time (e.g., two hours) after the transaction time, a third score associated with a third time (e.g., three hours), and so on. The first time, second time, third time, etc. may be associated with larger time increments or smaller time increments that what is provided as an example. And, in some examples, refund prediction module 334 may determine scores for more than or less than three times. Additionally and/or alternatively, in at least one example, refund prediction module 334 may determine a first score associated with a first time interval (e.g., zero-one hour) after the transaction time, a second score associated with a second time interval (e.g., one-two hours) after the transaction time, a third score associated with a third time interval (e.g., two-three hours), and so on. The first time interval, second time interval, third time interval, etc. may be associated with larger time intervals or smaller time intervals that what is provided as an example. And, in some examples, refund prediction module 334 may determine scores for more than or less than three time intervals. In at least one example, refund prediction module 334 may determine a time that a refund request is likely to occur based on the one or more scores, as describe below with reference to FIG. 5.

In at least one example, refund prediction module 334 may determine whether individual items of a transaction are likely to be associated with a refund request. That is, in some examples, refund prediction module 334 may apply the data model to transaction data associated with each item of a transaction, merchant data, and/or customer data to determine whether each item of the transaction is likely to be associated with a refund request and, in some examples, a timing associated with the refund request.

As described below, with reference to FIG. 5, in at least one example, refund prediction module 334 may determine a timing associated with a refund request. In some examples, refund prediction module 334 may output a particular time after a transaction time associated with a score, as described above. In such examples, refund prediction module 334 may determine the timing based on the particular time. In other examples, when refund prediction module 334 outputs one or more scores for one or more times and/or time intervals after a transaction time, refund prediction module 334 may predict a time and/or time interval that the customer is most likely to submit the refund request. In some examples, refund prediction module 334 may determine a time and/or time interval with a greatest score to be the time and/or time interval that the customer is most likely to submit the refund request. In other examples, refund prediction module 334 may combine one or more scores associated with one or more times within a time interval to determine a likelihood that the customer will request a refund within the time interval. Then, refund prediction module 334 may compare the combined scores for a first time interval with combined scores for a second time interval and may determine that the time interval with the greatest combined scores is the time interval corresponding to when the customer is most likely to submit the refund request.

In some examples, refund prediction module 334 may send an output to delay determination module 336 and delay determination module 336 may leverage the output as described below. In other examples, refund prediction module 334 may send an output to server-side transaction handling module 332 and server-side transaction handling module 332 may leverage the output for making other transaction processing decisions.

For instance, in at least one example, server-side transaction handling module 332 may leverage a score indicating a likelihood of a refund request for a particular transaction to determine whether to process the transaction as a single message transaction or a dual message transaction. As described above, in some examples, single message transactions and dual message transactions may be associated with different interchange fees. For instance, a single message transaction may be associated with lower interchange fees than a dual message transaction, or vice versa. Or, a single message transaction may be associated with a lower refund request fee than a dual message transaction, or vice versa. In some examples, delaying processing of a single message transaction may be less risky than a dual message transaction, or vice versa. Accordingly, server-side transaction handling module 332 may determine how to process a transaction based on the score. That is, in such examples, the server-side handling module 332 may leverage the score to determine how to process the transaction via the process with the lowest risk and/or lowest cost.

Additionally and/or alternatively, server-side transaction handling module 332 may leverage a score indicating a likelihood of a refund request for a particular transaction to determine when merchant 102 may collect funds equal to the cost of the particular transaction. In at least one example, payment processing service 104 may require merchants to wait to collect funds until some period of time lapses (i.e., a wait period). This may serve to mitigate risk to payment processing service 104. However, some merchants may be eligible to collect funds without the wait period. For instance, such merchants may have achieved a threshold level of credibility, been determined to have a risk level below a threshold, etc. In some examples, server-side transaction handling module 332 may leverage the score to determine whether to permit merchant 102 to access funds without waiting for the period of time to lapse. In such examples, based on determining that the score is above a threshold (i.e., the transaction is likely to be associated with a refund request), server-side transaction handling module 332 may determine not to permit merchant 102 to access funds without waiting for the period of time to lapse. Conversely, based on determining that the score is below a threshold (i.e., the transaction is not likely to be associated with a refund request), server-side transaction handling module 332 may determine to permit merchant 102 to access funds without waiting for the period of time to lapse.

Delay determination module 336 may determine whether to delay sending a request to process at least a portion of the transaction data to payment service 106 and, in some examples, how long to delay sending the request to process at least the portion of the transaction data. In single message transactions and/or dual message transactions, delay determination module 336 may leverage the output of refund prediction module 334 to determine whether to delay sending an authorization request to payment service 106. In dual message transactions, delay determination module 336 may leverage the output of refund prediction module 334 to determine whether to delay sending a capture request to payment service 106. Additional details associated with determining whether to delay sending a request to process at least a portion of the transaction data to payment service 106 and, in some examples, how long to delay sending the request to process at least the portion of the transaction data are described below with reference to FIG. 5. In at least one example, delay determination module 336 may access one or more rules 342 to determine whether to delay sending the request and/or how long to delay sending the request. In some examples, rule(s) 342 may be learned over time and/or provided by a programmer. Non-limiting examples of rule(s) 342 are described below with reference to FIGS. 6 and 7.

Server(s) 322 may further include data store 338. Data store 338 may be configured to store data so that it may be accessible, manageable, and updatable. Data store 338 may be communicatively coupled to server(s) 322 or integrated with server(s) 322. In at least one example, data store 338 may include model(s) 340, customer profile(s) 344, and/or merchant profile(s) 346. In some examples, model(s) 340, customer profile(s) 344, and/or merchant profile(s) 346 may be associated with individual databases, as illustrated in FIG. 3. In other examples, model(s) 340, customer profile(s) 344, and/or merchant profile(s) 346 may be associated with a single database. Model(s) 340 may store one or more data models trained via training module 330, as described above.

Customer profile(s) 344 may store one or more customer profiles. A customer profile may store data associated with a customer (e.g., customer 100) including, but not limited to, data including information about customer 100 (e.g., name of the customer, geographic location of the customer, age of the customer, income of the customer, etc.), information about payment instruments of customer 100 (e.g., numbers associated with payment instruments, verification values (e.g., PVKI, PVV, CVV, CVC, etc.) associated with the payment instruments, expiration dates associated with the payment instruments, PAN corresponding to customer 100 (which may or may not match the number associated with the payment instrument), restrictions on what types of charges/debts may be made, etc.), information associated with previous transactions of a customer (e.g., merchants associated with the transactions, total costs of each of the transactions, items acquired through the transactions, returns and/or refunds requested by the customer, etc.), etc.

Merchant profile(s) 346 may store one or more merchant profiles. A merchant profile may store data associated with a merchant (e.g., merchant 102) including, but not limited to, data including information about merchant 102 (e.g., name of the merchant, geographic location of the merchant, types of goods or services offered by the merchant, operating hours of the merchant, a merchant identifier, a merchant category classification, etc.), information about events associated with merchant 102 (e.g., past and upcoming events, dates of events, locations of events, etc.), accounting information associated with merchant 102 (e.g., bank(s) that the merchant banks with, etc.), contractual information associated with merchant 102 (e.g., terms of a contract between the merchant and the payment processing service), transactional information associated with merchant 102 (e.g., transactions conducted by the merchant, goods and/or service associated with the transactions, total spends of each of the transactions, parties to the transactions, dates, times, and/or locations associated with the transactions, refunds associated with the transaction(s), etc.), etc. As described above, in some examples, at least some merchant data may be stored in merchant profile 320 on device 302.

As described above, payment processing service 104 may communicate with payment service 106 via network(s) 306 to process transaction(s). For the purpose of this discussion, payment service 106 may be a card payment network, a card-issuing bank, an acquiring bank, etc. An acquiring bank may be a registered member of a card association (e.g., VISA®, MASTERCARD®), and may be part of a card payment network. An issuing bank may issue payment cards to customers, and may pay acquiring banks for purchases made by cardholders to which the issuing bank has issued a payment card. Accordingly, in some examples, payment service 106 associated with an acquiring bank may be included in the system 300 and may communicate with payment service 106 associated with of a card-issuing bank to obtain payment. Further, in some examples, a customer may use a debit card or gift card instead of a credit card, in which case, payment service 106 associated with a bank or other institution corresponding to the debit card or gift card may receive communications regarding a transaction in which the customer is participating. Additionally, there may be payment services of other financial institutions involved in some types of transactions or in alternative system architectures, and thus, the foregoing are merely several examples for discussion purposes.

In at least one example, payment service 106 may include one or more devices 304. In some examples, device(s) 304 may be one or more servers and/or another type of device. For instance, a device of device(s) 304 may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc.

Device(s) 304 may include processing unit(s) 348, computer-readable media 350, and network interface 352. The processing unit(s) 348 may execute one or more modules and/or processes to cause device(s) 304 to perform a variety of functions, as set forth above and explained in further detail in the following disclosure. In some examples, the processing unit(s) 348 may include a CPU, a GPU, both CPU and GPU, or other processing units or components known in the art. Additionally, each of the processing unit(s) 348 may possess its own local memory, which also may store program modules, program data, and/or one or more operating systems. Depending on the exact configuration and type of device(s) 304, computer-readable media 350 may include volatile memory (such as RAM), non-volatile memory (such as ROM, flash memory, miniature hard drive, memory card, or the like), or some combination thereof. Device(s) 304 may include network interface 352 for interfacing with network(s) 306, as described below.

In at least one example, computer-readable media 350 may include one or more modules for processing transactions. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they may generate useful data or other output using specified input(s). A module may or may not be self-contained. An application program (also called an "application") may include one or more modules, or a module may include one or more application programs. In some examples, a module may include an API to perform some or all of its functionality (e.g., operations). In additional and/or alternative examples, the module(s) may be implemented as computer-readable instructions, various data structures, and so forth via at least one processing unit (e.g., processing unit(s) 348) to configure device(s) 304 to execute instructions and to perform operations described herein. The module(s) may include payment service transaction handling module 354.

Payment service transaction handling module 354 may exchange communications with server-side transaction handling module 332. As described above, in at least one example, server-side transaction handling module 332 may send authorization request(s), capture request(s), refund request(s), etc. to payment service 106. For instance, server-side transaction handling module 332 may send an authorization request for authorization of a particular payment instrument for a particular amount (e.g., a cost of a transaction). In such examples, the authorization request may include payment data, as described above. In at least one example, the payment service transaction handling module 332 may send communications indicating whether authorization request(s), capture request(s), refund request(s), etc. are approved, processing, etc.

Network(s) 306 may be any type of network known in the art, such as a local area network or a wide area network, such as the Internet, and may include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 306 may include both wired and/or wireless communication technologies, including Bluetooth®, BLE, Wi-Fi and cellular communication technologies, as well as wired or fiber optic technologies. Components used for such communications may depend at least in part upon the type of network, the environment selected, or both. Protocols for communicating over such networks are well known and will not be discussed herein in detail. Consequently, device 302, device(s) 304, and/or server(s) 322 may communicatively couple to network(s) 306 in any manner, such as by a wired or wireless connection. Network(s) 306 may also facilitate communication between device 302, device(s) 304, and/or server(s) 322. In turn, network interfaces (e.g., network interface 316, network interface 328, and/or network interface 352) may be any network interface hardware components that may allow device 302, device(s) 304, and/or server(s) 322 to communicate over network(s) 306. In some examples customer 100 may operate a device (not shown), which may communicate with device 302 via network(s) 306.

Figure 4:
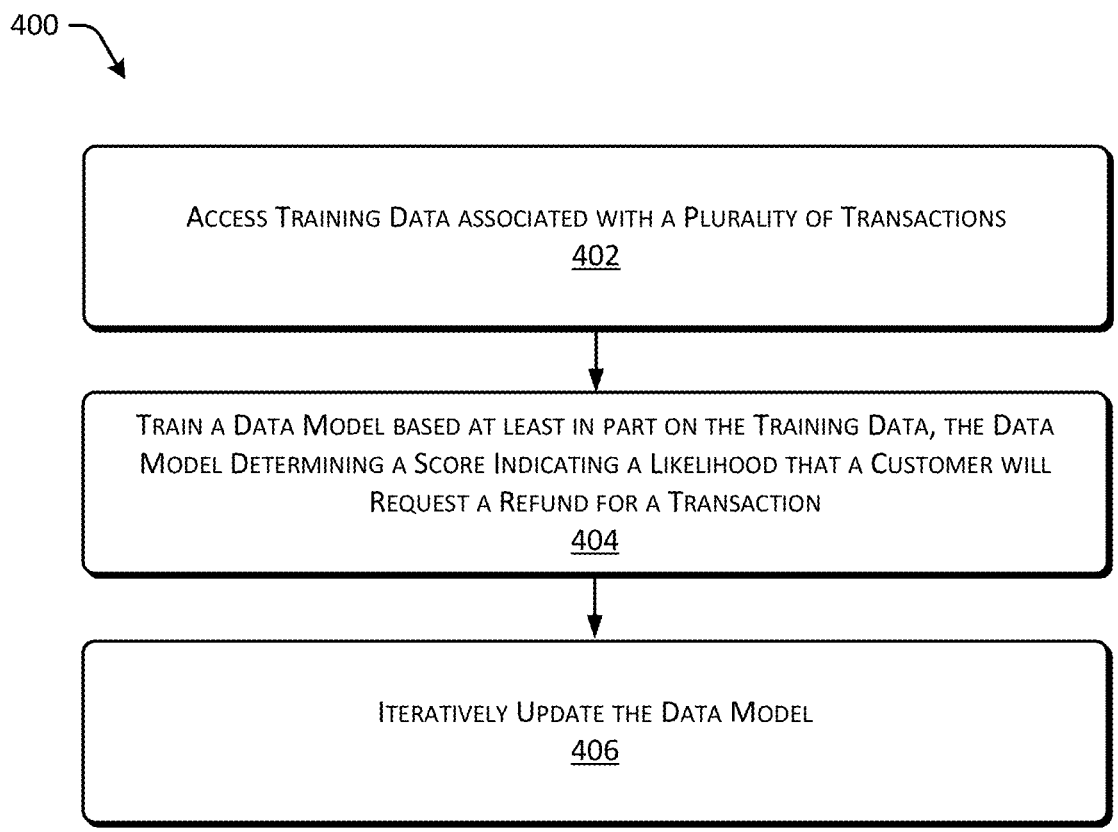
FIG. 4 depicts a non-limiting flow diagram illustrating a method for training a data model to determine a score indicating whether a transaction, or a portion of a transaction, is likely to be associated with a refund request in accordance with some examples of the present disclosure.
Figure 5:
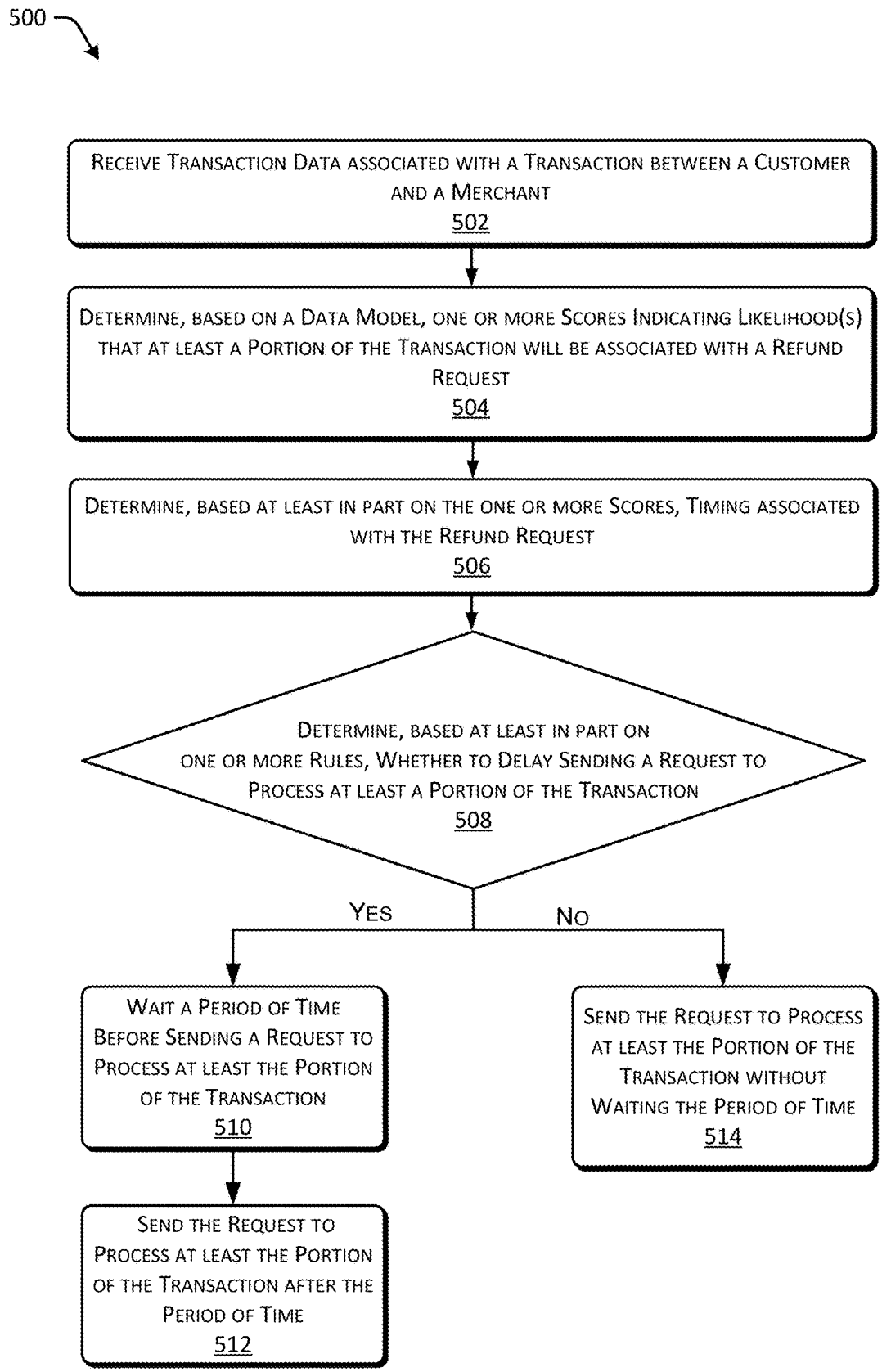
FIG. 5 depicts a non-limiting flow diagram illustrating a method for determining whether at least a portion of a transaction is likely to be associated with a refund request and making decisions with respect to processing the transaction based on the likelihood that at least a portion of the transaction will be associated with a refund request in accordance with some examples of the present disclosure.

FIGS. 4 and 5 illustrate various processes in accordance with some examples of the present disclosure. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIG. 4 depicts a non-limiting flow diagram illustrating a method 400 for training a data model to determine a score indicating whether a transaction, or a portion of a transaction, is likely to be associated with a refund request. FIG. 4 is described below in system 300 described above with reference to FIG. 3, but is not limited to such a system.

Block 402 illustrates accessing training data associated with a plurality of transactions. As described above, training module 330 may access training data. The training data may include data associated with a plurality of previously conducted transactions. In an example, a training data item may include data identifying merchant data, customer data, and transaction data associated with a transaction. Additionally, a training data item may include data indicating whether a transaction was associated with a refund request and, if the transaction was associated with a refund request, the timing of the refund request.

Block 404 illustrates training a data model based at least in part on the training data, the data model determining a score indicating a likelihood that a customer will request a refund for a transaction. Training module 330 may train a data model based on a plurality of training data items such that, given a new input of customer data, merchant data, and/or transaction data associated with a transaction, the data model may output a score indicating a likelihood that a customer will request a refund for the transaction. In at least one example, training module 330 may utilize a machine learning mechanism to train the data model. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

Training module 330 may leverage customer data, including but not limited to, data including information about customer 100 (e.g., name of the customer, geographic location of the customer, age of the customer, income of the customer, etc.), information about payment instruments of customer 100 (e.g., numbers associated with payment instruments, verification values (e.g., PVKI, PVV, CVV, CVC, etc.) associated with the payment instruments, expiration dates associated with the payment instruments, PAN corresponding to customer 100 (which may or may not match the number associated with the payment instrument), restrictions on what types of charges/debts may be made, etc.), information associated with previous transactions of a customer (e.g., merchants associated with the transactions, total costs of each of the transactions, items acquired through the transactions, returns and/or refunds requested by the customer, etc.), etc. to determine trends associated with refund requests of transaction(s). Additionally and/or alternatively, training module 330 may leverage merchant data, including, but not limited to, data including information about merchant 102 (e.g., name of the merchant, geographic location of the merchant, types of goods or services offered by the merchant, operating hours of the merchant, a merchant identifier, a merchant category classification, etc.), information about events associated with merchant 102 (e.g., past and upcoming events, dates of events, locations of events, etc.), accounting information associated with merchant 102 (e.g., bank(s) that the merchant banks with, etc.), contractual information associated with merchant 102 (e.g., terms of a contract between the merchant and the payment processing service), transactional information associated with merchant 102 (e.g., transactions conducted by the merchant, goods and/or service associated with the transactions, total spends of each of the transactions, parties to the transactions, dates, times, and/or locations associated with the transactions, refunds associated with the transaction(s), etc.), etc. to determine trends associated with refund requests of transaction(s). Furthermore, training module 330 may leverage transaction data, including payment data (e.g., a name of customer 100, an address of customer 100, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to customer 100 (which may or may not match the number associated with the payment instrument), restrictions on what types of charges/debts may be made, etc.), customer authentication data (e.g., a password, a PIN number, a signature, a biometric indicator, etc.), and/or point-of-purchase data (e.g., a cost of a transaction, item(s) purchased via the transaction, a timestamp associated with the transaction, a datestamp associated with the transaction, etc.), etc., to determine trends associated with refund requests of transaction(s).

In some examples, the data model may be trained to output a binary prediction regarding whether a transaction is likely to be associated with a refund request (e.g., yes or no), which may be based on a likelihood of a transaction being associated with a refund request being above (or below) a predetermined threshold. In some examples, the binary prediction may be associated with a score indicating a likelihood that the transaction will be associated with a refund request. As a non-limiting example, training data may indicate that transactions for a particular item at a coffee shop are frequently associated with a refund request. In such an example, the data model may be trained to output an indication that a transaction associated with the particular item at the coffee shop is likely to be associated with a refund request. Furthermore, in some examples, the data model may be trained to output a score indicating how likely the transaction is to be associated with a refund request. In another example, training data may indicate that transactions that are completed by a particular card type (e.g., a rewards card only offered to customers that spend over a certain amount of money annually), at a particular time, and in a particular geographic location are frequently associated with a refund request. Accordingly, the data model may be trained to output an indication that a transaction associated with the particular card type, at the particular time, in the particular geographic location is likely to be associated with a refund request. Furthermore, in some examples, the data model may be trained to output a score indicating how likely the transaction is to be associated with a refund request.

In at least one example, the data model may be trained to output a time associated with the indication that a transaction is likely to be associated with a refund request. As a non-limiting example, training data may indicate that a particular customer returns a particular item over a threshold value six hours after the customer purchases the particular item. In such an example, the data model may be trained to output a score indicating that the customer is likely to return the particular item and an indication that the refund request is likely to be six hours after the transaction time.

In at least one example, the data model may be trained to output one or more scores associated with one or more times after a transaction time. The one or more scores may indicate likelihoods that a transaction will be associated with a refund request at the one or more times. For instance, in at least one example, the data model may be trained to determine a first score associated with a first time (e.g., one hour) after the transaction time, a second score associated with a second time (e.g., two hours) after the transaction time, a third score associated with a third time (e.g., three hours), and so on. The first time, second time, third time, etc. may be associated with larger time increments or smaller time increments than provided in the examples. And, in some examples, the data model may be trained to determine scores for more than or less than three times.

As a non-limiting example, training data may indicate that transactions for a particular item at merchants associated with a particular merchant category classification are returned between four and seven hours after purchase. In such an example, the data model may be trained to output a score indicating a likelihood that a transaction associated with the particular item at a merchant associated with the particular merchant category classification will be returned one hour after the transaction time, two hours after the transaction time, and so on. In such an example, the scores associated with the fourth, fifth, sixth, and seventh hours after the transaction time may be greater than scores associated with other hours. In at least one example, one of the fourth, fifth, sixth, or seventh hour scores may be the same or different. For instance, in an example, one of the fourth, fifth, sixth, or seventh hour scores may be higher than the others, indicating that a refund request is most likely to happen at that time.

In an alternative example, the data model may be trained to output one or more scores associated with one or more times intervals after a transaction time. The one or more scores may indicate likelihoods that a transaction will be associated with a refund request at the one or more time intervals. For instance, in at least one example, the data model may be trained to determine a first score associated with a first time interval (e.g., zero-one hour) after the transaction time, a second score associated with a second time interval (e.g., one-two hours) after the transaction time, a third score associated with a third time interval (e.g., two-three hours), and so on. The first time interval, second time interval, third time interval, etc. may be associated with larger time intervals or smaller time intervals than provided in the examples. And, in some examples, the data model may be trained to determine scores for more than or less than three time intervals.

As a non-limiting example, training data may indicate that transactions that are completed online, at a particular time of day, that exceed a threshold amount, are associated with a refund request between two and five hours after purchase. In such an example, the data model may be trained to output a score indicating a likelihood that an online transaction, at the particular time of day, that exceeds the threshold amount, will be the subject of a refund request in predetermined time intervals. For instance, the data model may output a first score associated with a first time interval (e.g., zero to two hours), a second score associated with a second time interval (e.g., two to five hours), a third score associated with a third time interval (e.g., five to eight hours), and so on. In such an example, the score associated with the second time interval may be greater than scores associated with other time intervals.

In at least one example, the data model may be trained to determine whether individual items of a transaction are likely to be associated with a refund request. In such an example, the data model may be trained on more granular transaction data. That is, a training data item may include customer data, merchant data, and/or transaction data associated with a single item of a transaction.

As a non-limiting example, training data may indicate that transactions for a particular item that are completed at a particular time of day and from a merchant associated with a particular merchant category classification are associated with a refund request between one and two minutes after purchase. In such an example, the data model may be trained to output scores indicating likelihoods that the particular item, purchased at the particular time of day, from a merchant associated with a particular merchant category classification will be the subject of a refund request in predetermined time intervals. For instance, the data model may output a first score associated with a first time interval (e.g., zero to two minutes), a second score associated with a second time interval (e.g., two to five minutes), a third score associated with a third time interval (e.g., five to eight minutes), and so on. In such an example, the score associated with the first time interval may be greater than scores associated with other time intervals.

Block 406 illustrates iteratively updating the data model. In at least one example, training module 330 may receive updated training data. For instance, training module 330 may receive updated training data after a lapse of a predetermined period of time, at a particular frequency, etc. The updated training data may include data associated with new transaction(s), output(s) of processing the data associated with the new transaction(s) using the data model, and data indicating whether any portion of the new transaction(s) was associated with a refund request, and if so, a timing associated with the refund request. In at least one example, training module 330 may receive updated training data and may re-train the data model based at least partly on the updated training data.

FIG. 5 depicts a non-limiting flow diagram illustrating a method 500 for determining whether at least a portion of a transaction is likely to be associated with a refund request and making decisions with respect to processing the transaction based on the likelihood that at least a portion of the transaction will be associated with a refund request. FIG. 5 is described below in system 300 described above with reference to FIG. 3, but is not limited to such a system.

Block 502 illustrates receiving transaction data associated with a transaction between a customer and a merchant. As described above, server-side transaction handling module 332 may receive transaction data from device 302. The transaction data may include payment data, customer authentication data, and/or point-of-purchase data, as described above.

Block 504 illustrates determining, based on a data model, one or more scores indicating likelihood(s) of a refund request associated with the transaction. In at least one example, refund prediction module 334 may determine whether a transaction is likely to be associated with a refund request. In at least one example, refund prediction module 334 may access transaction data from server-side transaction handling module 332, customer data from a customer profile of the customer profile(s) 344 corresponding to customer 100 (if available), and/or merchant data from a merchant profile of the merchant profile(s) 346 (if available). Refund prediction module 334 may access a data model from model(s) 340 and may apply the data model to the transaction data, the customer data, and/or the merchant data.

As described above, in at least one example, refund prediction module 334 may output one or more scores indicating likelihood(s) that a transaction will be associated with a refund request. In some examples, refund prediction module 334 may output a particular time after a transaction time associated with a score. In other examples, refund prediction module 334 may output one or more scores associated with one or more times and/or time intervals after a transaction time. For instance, refund prediction module 334 may determine a first score associated with a first time (e.g., one hour) after the transaction time, a second score associated with a second time (e.g., two hours) after the transaction time, a third score associated with a third time (e.g., three hours), and so on. Additionally and/or alternatively, in at least one example, refund prediction module 334 may determine a first score associated with a first time interval (e.g., zero-one hour) after the transaction time, a second score associated with a second time interval (e.g., one-two hours) after the transaction time, a third score associated with a third time interval (e.g., two-three hours), and so on.

Block 506 illustrates determining, based at least in part on the one or more scores, timing associated with the refund request. As described above, in at least one example, refund prediction module 334 may output one or more scores indicating likelihood(s) that a transaction will be associated with a refund request. In some examples, refund prediction module 334 may output a particular time after a transaction time associated with a score. In such examples, refund prediction module 334 may determine the timing based on the particular time.

In other examples, refund prediction module 334 may output one or more scores for one or more times and/or time intervals after a transaction time, as described above. In such examples, refund prediction module 334 may predict a time and/or time interval that the customer is most likely to submit the refund request. In some examples, refund prediction module 334 may determine a time and/or time interval with a greatest score to be the time and/or time interval that the customer is most likely to submit the refund request. In other examples, refund prediction module 334 may combine one or more scores associated with one or more times within a time interval to determine a likelihood that the customer will request a refund within the time interval. Then, refund prediction module 334 may compare the combined scores for a first time interval with combined scores for a second time interval and may determine that the time interval with the greatest combined scores is the time interval corresponding to when the customer is most likely to submit the refund request.

Block 508 illustrates determining, based at least in part on one or more rules, whether to delay sending a request to process at least a portion of the transaction. Delay determination module 336 may determine whether to delay sending a request to process at least a portion of the transaction data to payment service 106 and, in some examples, how long to delay sending the request to process at least the portion of the transaction data. In at least one example, delay determination module 336 may access one or more rules 342 to determine whether to delay sending the request and/or how long to delay sending the request. Different rule(s) 342 may apply to different times and/or time intervals. Additional details associated with applying the one or more rules 342 are described below with reference to FIGS. 6 and 7.

Based at least in part on determining to delay sending the request, server-side transaction handling module 332 may wait a period of time before sending a request to process at least the portion of the transaction, as illustrated in block 510. The period of time may be determined based on rule(s)

342, as described above. Then, server-side transaction handling module 332 may send the request to process at least the portion of the transaction after the period of time, as illustrated in block 512. In single message transactions or dual message transactions, server-side transaction handling module 332 may delay sending an authorization request to payment service 106 until after the period of time. In dual message transactions, server-side transaction handling module 332 may delay sending a capture request to payment service 106 until after the period of time.

Based at least in part on determining not to delay sending the request, server-side transaction handling module 332 may send the request to process at least the portion of the transaction without waiting the period of time, as illustrated in block 514. In single message transactions or dual message transactions, server-side transaction handling module 332 may send an authorization request to payment service 106 without waiting the period of time. In dual message transactions, server-side transaction handling module 332 may send a capture request to payment service 106 without waiting the period of time.

In at least one example, refund prediction module 334 may determine whether individual items of a transaction are likely to be associated with a refund request. That is, in some examples, refund prediction module 334 may apply the data model to transaction data associated with each item of the transaction, merchant data, and/or customer data to determine whether each item of the transaction is likely to be associated with a refund request and, in some examples, timing associated with the refund request(s). In some examples, delay determination module 336 may delay processing the entire transaction. In other examples, delay determination module 336 may determine to delay processing a portion of the transaction that corresponds to an item that is likely to be associated with a refund request. In such examples, server-side transaction handling module 332 may send a request for an authorization (e.g., single message transaction or dual message transaction) or capture (e.g., dual message transaction) for the other portion of the transaction associated with item(s) that are not likely to be subject to a refund request without waiting the period of time. That is, in such examples, server-side transaction handling module 332 may send a partial authorization request (e.g., single message transaction or dual message transaction) or a partial capture request (e.g., dual message transaction).

As described above, delay determination module 336 may leverage one or more rules 342 to determine whether to delay sending a request to payment service 106. In at least one example, a rule may be associated with a determined risk of obtaining funds from a particular customer. That is, in at least one example, a rule may instruct delay determination module 336 to determine a likelihood that payment processing service 104 will be able to obtain funds from a particular customer if server-side transaction handling module 332 delays sending a request to process at least a portion of a transaction and determine whether to delay sending a request based on the determined likelihood. In some examples, payment processing service 104 may access a risk profile associated with a particular customer associated with a transaction to determine whether to delay sending a request. In other examples, payment processing service 104 may determine, based on customer data, a risk profile associated with a particular customer associated with a transaction to determine whether to delay sending a request. Based at least in part on a risk profile being above a threshold (e.g., payment processing service 104 is not likely to recover funds if it delays), delay determination module 336 may determine not to delay sending a request to process at least a portion of a transaction. In some examples, this rule (i.e., do not delay if a risk profile is above a threshold) may supersede all other rules described herein. In other examples, such a risk may be considered in risk analyses described below.

Figure 6:
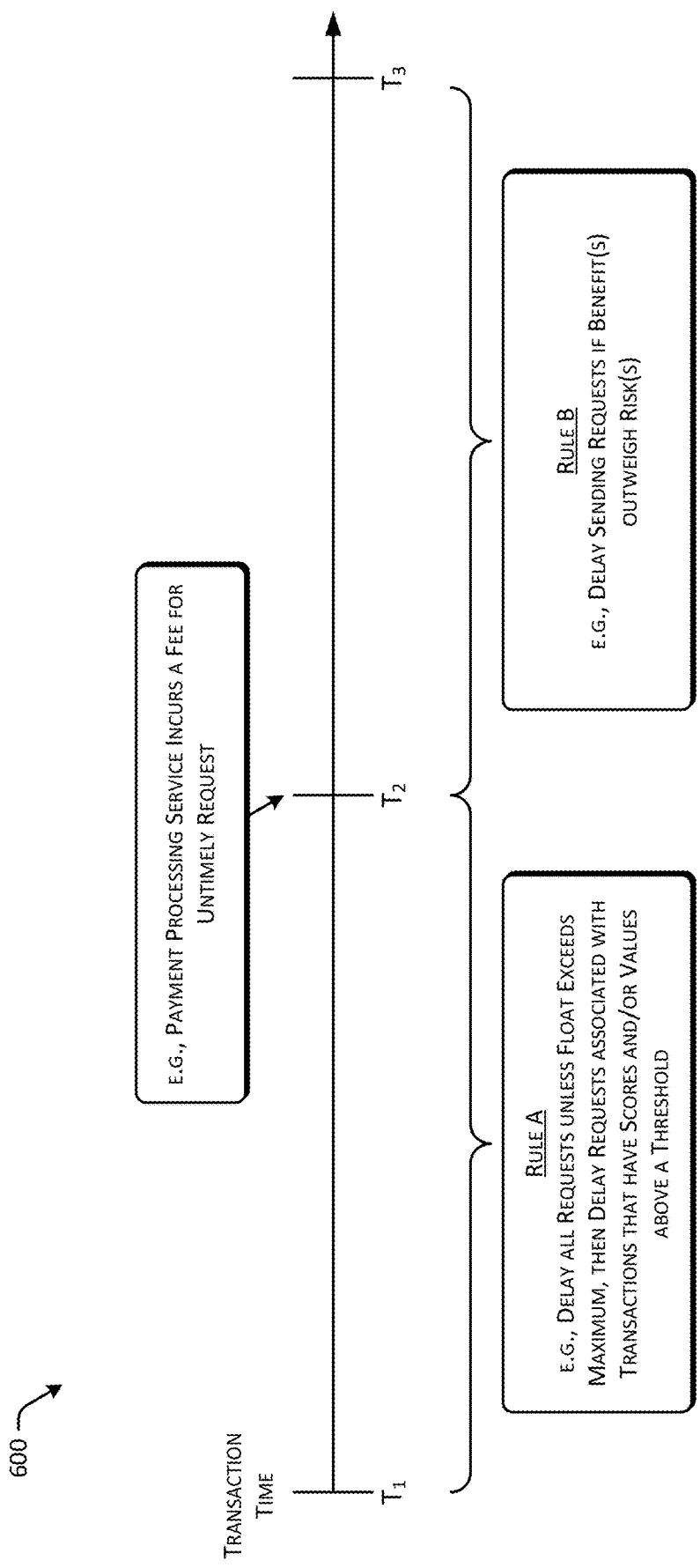
FIG. 6 illustrates an example of rule(s) that may be used to determine whether to delay sending a request to process at least a portion of transaction data in accordance with some examples of the present disclosure.
Figure 7:
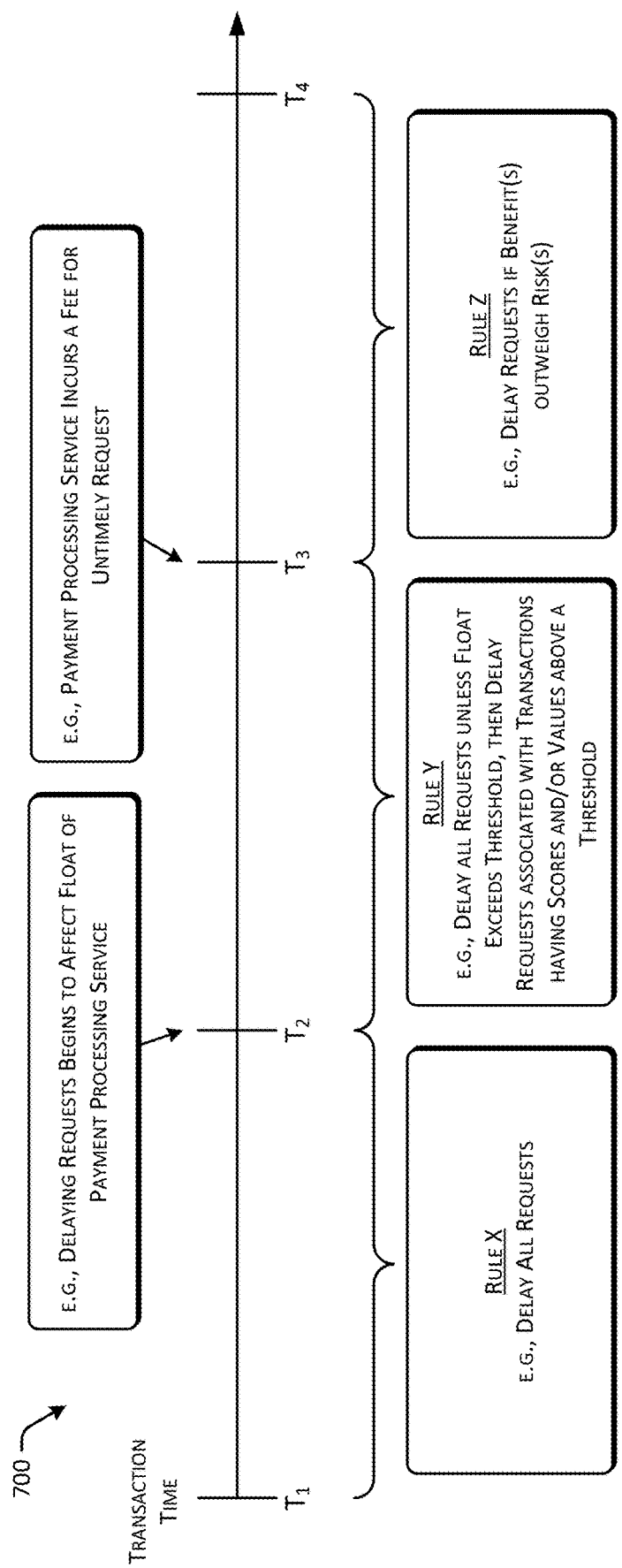
FIG. 7 illustrates an example of rule(s) that may be used to determine whether to delay sending a request to process at least a portion of transaction data in accordance with some examples of the present disclosure.

FIGS. 6 and 7 illustrate examples of rule(s) 342 that may be used to determine whether to delay sending a request to process at least a portion of transaction data.

In FIG. 6, a set of rules is shown with reference to a timeline 600. The first time ($T_1$) corresponds to a transaction time (i.e., the time that device 302 receives payment data from a payment instrument of customer 100). The second time ($T_2$) and third time ($T_3$) may correspond to predetermined times after the transaction time. The predetermined times may be determined based on when payment service 106 imposes a fee on payment processing service 104, when payment processing service 104 is exposed to increased risk, when delaying sending request(s) impacts float, an arbitrary time, etc. In some examples, the time between the first time and the second time may be a same amount of time as the time between the second time and the third time. In other examples, the time between the first time and the second time may be a different amount of time as the time between the second time and the third time.

In FIG. 6, the second time may correspond to a time after which payment processing service 104 incurs a fee for sending an untimely request. In at least one example, data associated with payment service 106 may indicate timing associated with when payment processing service 104 is required to send request(s). The same data may indicate interchange fees, refund fees, etc. In at least one example, the data associated with payment service 106 may indicate a time after which it will impose on payment processing service 104 a late fee for sending a request. For instance, in an example, payment service 106 may impose on payment processing service 104 a fee for sending a capture request more than 12 hours after the transaction time. In such an example, the second time may correspond to 12 hours after the transaction time.

In at least one example, a first rule (e.g., Rule A) may be applicable to determining whether to delay a request to process at least a portion of transaction data that is associated with a transaction (or portion thereof) that is likely to be subject to a refund request between the first time and the second time, and a second rule (e.g., Rule B) may be applicable to determining whether to delay a request to process at least a portion of transaction data that is associated with a transaction (or portion thereof) that is likely to be subject to a refund request between the second time and the third time. Delay determination module 336 may determine which rule to use (e.g., Rule A or Rule B) based on the predicted timing of a refund request (e.g., as described above in block 506 of FIG. 5). That is, if the predicted timing of the refund request is between the first time and the second time, delay determination module 336 may apply Rule A to determine whether to delay a request to process at least a portion of the transaction. Or, if the predicted timing of the refund request is between the second time and the third time, delay determination module 336 may apply Rule B to determine whether to delay a request to process at least a portion of the transaction.

As a non-liming example, in FIG. 6, Rule A may instruct delay determination module 336 to delay all requests that are associated with transactions (or portions thereof) where a refund request is likely to happen prior to the second time, unless the float exceeds a maximum float. For the purpose of this discussion, the float may correspond to a sum of monies that have been paid to merchants but not yet settled by payment processing service 104 (i.e., payment processing service 104 has not yet received the funds). In some examples, there may be a limit on the float. That is, in some examples, payment processing service 104 may determine a maximum float, which may be dynamic.

In the event the float exceeds the maximum float, Rule A may instruct delay determination module 336 to delay requests associated with transactions that have scores and/or values above a threshold. For the purpose of this discussion, a value of a refund request may be computed based on determining a product of a score associated with the transaction (or portion thereof) and a cost of the refund request. That is, the value of the refund request may correspond to the value that payment processing service 104 may save (or lose) based on delaying a request to process at least a portion of the transaction and subsequently receiving the refund request, in view of the likelihood of a refund request. In some examples, a cost of a refund request may be positive or negative. In at least one example, per Rule A, based on determining that a plurality of requests cannot be delayed because the delay would cause the float to exceed the maximum float, delay determination module 336 may determine which requests of the plurality of requests have a score and/or a value above a threshold. Delay determination module 336 may determine to delay requests that have a score and/or a value above a threshold and to send the remaining requests without delay.

Rule A is but one example of a rule that may be applicable for determining whether to delay request(s). In an alternative example, a rule may instruct delay determination module 336 to delay all requests that are associated with transactions (or portions thereof) where a refund request is likely to happen prior to the second time (i.e., without regard to the effect of the delay on the float). In at least one example, a rule may instruct delay determination module 336 to delay all requests that have a score, a value, etc. above a threshold. In some examples, a rule may instruct delay determination module 336 to delay a predetermined number, a predetermined percentage, etc. of requests that are associated with transactions (or portions thereof) where refund requests are likely to happen prior to the second time. In such examples, a rule may instruct delay determination module 336 how to determine which requests to delay. For instance, requests associated with transactions (or portion thereof) having the highest scores (i.e., most likely to be associated with a refund request), highest values (i.e., most valuable), etc. may be prioritized over other requests. In some examples, a rule may instruct delay determination module 336 to perform a risk analysis to determine whether to delay a request. Additional details associated with such a risk analysis are described below.

As a non-liming example, in FIG. 6, Rule B may instruct delay determination module 336 to delay sending requests if benefit(s) outweigh risk(s). That is, Rule B may instruct delay determination module 336 to perform a risk analysis prior to determining whether to delay sending a request. In an example, a risk may be associated with one or more fees imposed on payment processing service 104 as a result of the delay. Examples of fees include, but are not limited to, a fee that payment processing service 104 will incur for failing to send a timely request, a fee that payment processing service 104 will incur for voiding a previously submitted request (e.g., authorization request), etc. In another example, a risk may be associated with the ability of payment processing service 104 to recover funds due to the delay. Further, a risk may be associated with an effect that a delay has on the float of payment processing service 104. On the other hand, a benefit may correspond to the value of a refund request. In some examples, rules associated with different time intervals may be associated with different risk analyses.

As described above, Rule B may instruct delay determination module 336 to compare risk(s) and benefit(s) to determine whether to delay a request. In examples where the risk(s) outweigh the benefit(s), delay determination module 336 may determine not to delay sending a request. In examples where the benefit(s) outweigh the risk(s), delay determination module 336 may determine to delay sending a request. As a non-limiting example, a risk may be associated with a fee incurred by payment processing service 104 for failing to send a timely request (i.e., prior to the second time). In at least one example, the benefit may correspond to the value of the refund request, as described above. In some examples, Rule B may also provide instructions for delay determination module 336 to consider the float in performing the risk analysis. In an example where the risks outweigh the benefits, delay determination module 336 may determine not to delay sending a request. That is, in an example where the fee and the effect of delaying a request on the float outweigh the value of the refund request, delay determination module 336 may determine not to delay sending a request. In an example where the benefits outweigh the risks, delay determination module 336 may determine to delay sending a request. That is, in an example where the value outweighs the fee and the effect of delaying a request on the float, delay determination module 336 may determine to delay sending a request.

In some examples, rule(s) 342 may be associated with a length of the delay, or a time period for waiting to send a request. For instance, a rule may indicate a time to send a request relative to a time on a relevant timeline. As a non-limiting example, Rule A may indicate to send a request to process at least a portion of transaction data at or prior to the second time. Or, a rule may indicate to wait a period of time until after a time predicted to be associated with a refund request. As a non-limiting example, Rule A and/or Rule B may indicate to send a request after a time predicted for the refund request. In some examples, rule(s) 342 may instruct the server-side transaction handling module 326 to batch all delayed requests and send them together at a particular time. As a non-limiting example, Rule A may indicate to batch all delayed requests together and sent them at the second time. Delay determination module 336 may leverage rule(s) 342 to determine a period of time that server-side transaction handling module 332 should wait prior to sending a request. Server-side transaction handling module 332 may utilize the information to determine when to send the request.

In FIG. 7, a set of rules is shown with reference to a timeline 700. The first time ($T_1$) corresponds to a transaction time (i.e., the time that device 302 receives payment data from a payment instrument of customer 100). The second time ($T_2$), third time ($T_3$), and fourth time ($T_4$) may correspond to predetermined times after the transaction time. As described above, the predetermined times may be determined based on when payment service 106 imposes a fee on payment processing service 104, when payment processing service 104 is exposed to increased risk, when delaying sending request(s) impacts the float, an arbitrary time, etc. In some examples, the intervals of time between the first time, second time, third time, and fourth time may be a same amount of time or some intervals of time may be larger or smaller than others.

As a non-limiting example, in FIG. 7, the second time may correspond to a time after which delaying request(s) begins to affect the float of payment processing service 104 and the third time may be associated with a time after which payment processing service 104 incurs a fee for (untimely) requesting to process at least a portion of the transaction data.

In at least one example, a first rule (e.g., Rule X) may be applicable to determining whether to delay a request to process at least a portion of transaction data that is associated with a transaction (or portion thereof) that is likely to be subject to a refund request between the first time and the second time, a second rule (e.g., Rule Y) may be applicable to determining whether to delay a request to process at least a portion of transaction data that is associated with a transaction (or portion thereof) that is likely to be subject to a refund request between the second time and the third time, and a third rule (e.g., Rule Z) may be applicable to determining whether to delay a request to process at least a portion of transaction data that is associated with a transaction (or portion thereof) that is likely to be subject to a refund request between the third time and the fourth time. Delay determination module 336 may determine which rule to use (e.g., Rule X, Rule Y, or Rule Z) based on the predicted timing of a refund request (e.g., as described above in block 506 of FIG. 5). That is, if the predicted timing of the refund request is between the first time and the second time, delay determination module 336 may apply Rule X to determine whether to delay a request to process at least a portion of the transaction. Or, if the predicted timing of the refund request is between the second time and the third time, delay determination module 336 may apply Rule Y to determine whether to delay a request to process at least a portion of the transaction. And, if the predicted timing of the refund request is between the third time and the fourth time, delay determination module 336 may apply Rule Z to determine whether to delay a request to process at least a portion of the transaction.

As a non-limiting example, Rule X may instruct delay determination module 336 to delay all requests. That is, in at least one example, payment processing service 104 may have determined that delaying requests until the second time does not affect the float and/or has an effect that is below a threshold. Accordingly, Rule X may instruct delay determination module 336 to delay all requests until the second time.

Further, as a non-limiting example, Rule Y may be applied to requests that are likely to occur between the second time and the third time. As illustrated, in at least one example, the second time may correspond to a time after which delaying requests begins to affect the float. The third time may correspond to the time after which payment processing service 104 incurs a fee for an untimely request. Accordingly, Rule Y may instruct delay determination module 336 to delay all requests that are associated with transactions (or portions thereof) where a refund request is likely to happen prior to the second time, unless the float exceeds a maximum float, and, in the event the float exceeds the maximum float, Rule Y may instruct delay determination module 336 to delay requests associated with transactions that have scores and/or values above a threshold. That is, Rule Y may be the same rule as Rule A described above.

As described above, the third time may correspond to the time after which payment processing service 104 incurs a fee for an untimely request. Accordingly, Rule Z may instruct delay determination module 336 to compare risk(s) and benefit(s) to determine whether to delay a request. In at least one example, the risk analysis associated with Rule Z may be the same risk analysis associated with Rule B, described above. That is, in at least one example, the fee may be considered a risk in the risk analysis.

In some examples, rule(s) 342 may be associated with a length of the delay, or a time period for waiting to send a request. For instance, a rule may indicate a time to send a request relative to a time on a relevant timeline. As a non-limiting example, Rule X may indicate to send a request to process at least a portion of transaction data at or prior to the second time or Rule Y may indicate to send a request to process at least a portion of transaction data at or prior to the third time. Or, a rule may indicate to wait a period of time until after a time predicted to be associated with a refund request. As a non-limiting example, Rule X, Rule Y, and/or Rule Z may indicate to send a request after a time predicted for the refund request. In some examples, rule(s) 342 may instruct the server-side transaction handling module 326 to batch all delayed requests and send them together at a particular time. As a non-limiting example, Rule Z may indicate to batch all delayed requests together and sent them at the fourth time. Delay determination module 336 may leverage rule(s) 342 to determine a period of time that server-side transaction handling module 332 should wait prior to sending a request. Server-side transaction handling module 332 may utilize the information to determine when to send the request.

While the set of rules shown with reference to timeline 600 includes two intervals of time (e.g., the first time to the second time and the second time to the third time) and the set of rules with reference to timeline 700 includes three intervals of time (e.g., the first time to the second time, the second time to the third time, and the third time to the fourth time), a timeline may be divided into any number of intervals of time. In some examples, each interval may be associated with a different rule. In other examples, one or more intervals may be associated with a same rule and/or one or more rules may be associated with a same interval. In some examples, the number of intervals and/or amount of time associated with an interval may be determined based on terms set by payment service 106.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system for processing payments, comprising:
   a point-of-sale (POS) application stored on a POS device of a merchant, the POS application comprising instructions to:
      receive, from a payment reader associated with the POS device, payment data associated with a payment card provided to satisfy a cost of a transaction between a customer and the merchant; and
      send transaction data associated with the transaction to one or more servers of a payment processing service, the transaction data indicating the payment data, the cost of the transaction, and an item purchased by the customer; and
   the one or more servers of the payment processing service, comprising:
      one or more processors;
      one or more computer-readable instructions executable by the one or more processors to:
         receive the transaction data from the POS application;
         send a request to authorize the payment data for the cost of the transaction to a payment service associated with the payment card of the customer;
         receive an indication from the payment service that the payment data has been authorized for the cost of the transaction;
         determine a likelihood that the customer will return the item to the merchant for the cost of the transaction at a first time, the likelihood being above a threshold probability indicating that the customer is likely to return the item;
         determine, based at least in part on data associated with the payment service, that the payment service will impose on the payment processing service a refund fee if the customer returns the item to the merchant for a refund of the cost of the item after the request to authorize and after a request to capture;
         determine, based at least in part on the data associated with the payment service, a second time after which the payment service will impose on the payment processing service a late fee for requesting a capture of the cost of the transaction from the payment service;
         determine that the first time is before the second time;
         waiting until a time between the first time and the second time; and
         sending, during the time between the first time and the second time, the request to capture the cost of the transaction to the payment service to avoid a probable imposition of the refund fee and a certain imposition of the late fee.

2. A system for processing payments as claim 1 recites, wherein the one or more computer-readable instructions are executable by the one or more processors further to:
   determine a maximum float associated with the payment processing service, the maximum float corresponding to a sum of monies that have been paid to merchants but not yet captured by the payment processing service; and
   determine that waiting until the time to send the request to capture the cost of the transaction does not cause the float to exceed the maximum float.

3. A computer-implemented method performed by one or more servers of a payment processing service, the computer-implemented method comprising:
   receiving, at a point-of-sale (POS) application associated with a POS device of a merchant, payment data associated with a payment instrument provided to satisfy a first cost of a first transaction between a first customer and the merchant, wherein the payment data is obtained by a reader device associated with the POS device;
   sending, from the POS application, first transaction data associated with the first transaction to the one or more servers of the payment processing service, the first transaction data including the payment data;
   receiving, by the one or more servers, the first transaction data from the POS application;
   based at least in part on a determination that the first customer will request a refund for the first cost of the first transaction after the first transaction, determining, by the one or more servers, to refrain, for at least a first period of time after the first transaction, from sending a request to process at least a portion of the first transaction data to a payment service; and
   sending, by the one or more servers and after waiting at least the first period of time, the request to process at least the portion of the first transaction data for the first cost of the first transaction to the payment service.

4. A computer-implemented method as claim 3 recites, further comprising determining, based at least in part on data associated with the payment service, that the payment service will impose on the payment processing service a refund fee if the payment processing service requests the refund for the first cost after the payment processing service sends the request to process at least the portion of the first transaction data.

5. A computer-implemented method as claim 4 recites, wherein:
   the first transaction is a single message transaction or a dual message transaction;
   the request to process corresponds to an authorization request to authorize the payment data for the first cost of the first transaction.

6. A computer-implemented method as claim 5 recites, further comprising:
   determining a risk associated with waiting the first period of time before sending the authorization request; and
   determining, based at least in part on the refund fee, a value associated with a refund request for the first transaction.

7. A computer-implemented method as claim 6 recites, further comprising sending the request to process, after waiting the first period of time, based at least in part on determining that the value outweighs the risk.

8. A computer-implemented method as claim 4 recites, wherein:
   the determination that the first customer will request a refund for the first cost of the first transaction is based at least in part on a likelihood that the first customer will request the refund at a first time after the first transaction;
   the first transaction is a dual message transaction; and
   the request to process corresponds to a capture request to capture the first cost of the first transaction, the capture request being sent after an authorization request to authorize the payment data for the first cost of the first transaction.

9. A computer-implemented method as claim 8 recites, further comprising, determining, based at least in part on the data associated with the payment service, a second time after which the payment service will impose on the payment processing service a late fee for sending the capture request.

10. A computer-implemented method as claim 9 recites, further comprising:
   determining that the first time is prior to the second time;
   determining a maximum float associated with the payment processing service, the float corresponding to a sum of monies that have been paid to merchants but not yet captured by the payment processing service; and
   determining that waiting the first period of time to send the capture request does not cause the float to exceed the maximum float,
   wherein the first time corresponds to an end of the first period of time and sending the capture request comprises sending the capture request after the first time.

11. A computer-implemented method as claim 9 recites, further comprising:
   determining that the first time is after the second time;
   determining, based at least in part on the late fee, a risk associated with waiting at least the first period of time before sending the capture request; and
   determining, based at least in part on the likelihood and the refund fee, a value associated with waiting at least the first period of time before sending the capture request.

12. A computer-implemented method as claim 11 recites, further comprising:
   determining that the risk outweighs the value,
   wherein the first period of time ends at or before the second time and sending the capture request comprises sending the capture request at or before the second time.

13. A computer-implemented method as claim 11 recites, further comprising:
   determining that the value outweighs the risk,
   wherein the first time corresponds to an end of the first period of time and sending the capture request comprises sending the capture request after the first time.

14. A computer-implemented method as claim 3 recites, further comprising:
   receiving, from the POS device, second transaction data associated with a second transaction between the merchant and a second customer;
   determining, based at least in part on the data associated with the payment service, that the payment service will impose on the payment processing service the refund fee if the payment processing service requests a refund for a second cost of the second transaction after the payment processing service sends a request to process at least a portion of the second transaction data;
   determining a risk associated with waiting a second period of time after the second transaction before sending the request to process at least the portion of the second transaction data;
   determining, based at least in part on the refund fee, a value associated with a refund request for the second transaction;
   determining the risk outweighs the value; and
   sending, to a payment service, the request to process at least the portion of the second transaction data for the second cost of the second transaction prior to an end of the second period of time.

15. A system of a payment processing service, the system comprising:
   a point-of-sale (POS) application stored on a POS device of a merchant, the POS application comprising instructions to:
      receive, from a payment reader associated with the POS device, payment data associated with a payment instrument provided to satisfy a cost of a first transaction between a first customer and the merchant; and
      send first transaction data associated with the first transaction to one or more servers of a payment processing service, the first transaction data indicating the payment data, the cost of the first transaction, and an item purchased by the first customer; and
   the one or more servers of the payment processing service, comprising:
      one or more processors; and
      one or more computer-readable instructions executable by the one or more processors to:
         receive, from the POS device of the merchant, the first transaction data associated with the first transaction;
         based at least in part on a determination that the first customer will request a refund for a first cost of the first transaction after the first transaction, determine to refrain for a period of time, after the first transaction, from sending a first request to process at least a portion of the first transaction data to a payment service; and
         send, after waiting the period of time, the first request to process at least the portion of the first transaction data for the first cost.

16. A system as claim 15 recites, the one or more computer-readable instructions executable by the one or more processors further to:
   determine one or more risks associated with waiting the period of time to send the first request;
   determine one or more potential benefits associated with waiting the period of time to send the first request;
   compare the one or more risks and the one or more potential benefits;
   determine the one or more potential benefits outweigh the one or more risks; and
   send the first request to process the portion of the first transaction data after the period of time based at least in part on determining the one or more potential benefits outweigh the one or more risks.

17. A system as claim 16 recites, the one or more computer-readable instructions executable by the one or more processors further to:
   determine, based at least in part on data associated with the payment service, a time after which the payment service will impose on the payment processing service a late fee for sending the first request; and
   determine the one or more risks based at least in part on the late fee.

18. A system as claim 15 recites, the one or more computer-readable instructions executable by the one or more processors further to:
   receive, from the POS device of the merchant, second transaction data associated with a second transaction between a second customer and the merchant;
   based at least in part on a determination that the second customer will not request a refund for a second cost of the second transaction after the second transaction, sending, without waiting, a second request to process at least a portion of the second transaction data for the second cost.

19. A system as claim 15 recites, the one or more computer-readable instructions executable by the one or more processors further to determine, based at least in part on the determination that the first customer will request the refund for the first cost of the first transaction after the first transaction, whether to process the first transaction as a single message transaction or a dual message transaction.

20. A system as claim 15 recites, the one or more computer-readable instructions executable by the one or more processors further to determine, based at least in part on the determination that the first customer will request the refund for the first cost of the first transaction after the first transaction, to prohibit the merchant from collecting funds equal to at least the first cost of the first transaction until after a predetermined time.

* * * * *